US008458085B1

(12) United States Patent
Yakubov

(10) Patent No.: US 8,458,085 B1
(45) Date of Patent: Jun. 4, 2013

(54) INVESTOR SOCIAL NETWORKING WEBSITE

(76) Inventor: Zelman Yakubov, Brooklyn, NY (US)

( * ) Notice: Subject to any disclaimer, the term of this patent is extended or adjusted under 35 U.S.C. 154(b) by 0 days.

(21) Appl. No.: 13/447,614

(22) Filed: Apr. 16, 2012

Related U.S. Application Data

(63) Continuation-in-part of application No. 13/118,709, filed on May 31, 2011.

(60) Provisional application No. 61/396,805, filed on Jun. 3, 2010.

(51) Int. Cl.
*G06Q 40/00* (2012.01)

(52) U.S. Cl.
USPC .............................. 705/38; 705/36 R; 705/35

(58) Field of Classification Search
USPC ...................................... 705/35, 38
See application file for complete search history.

(56) References Cited

U.S. PATENT DOCUMENTS

| | | | | |
|---|---|---|---|---|
| 5,630,073 | A * | 5/1997 | Nolan .............................. | 705/45 |
| 6,324,353 | B1 * | 11/2001 | Laussermair et al. .......... | 399/16 |
| 6,347,307 | B1 | 2/2002 | Sandhu et al. | |
| 6,405,204 | B1 | 6/2002 | Baker et al. | |
| 7,103,556 | B2 | 9/2006 | Del Rey et al. | |
| 7,149,716 | B2 | 12/2006 | Gatto | |
| 8,150,752 | B2 * | 4/2012 | Smith ............................. | 705/35 |
| 2001/0049651 | A1 | 12/2001 | Selleck | |
| 2002/0091607 | A1 | 7/2002 | Sloan et al. | |
| 2002/0147671 | A1 | 10/2002 | Sloan et al. | |
| 2003/0093353 | A1 | 5/2003 | Ward et al. | |
| 2006/0282482 | A1 | 12/2006 | Castro et al. | |
| 2007/0150397 | A1 | 6/2007 | Rossen et al. | |
| 2008/0306851 | A1 * | 12/2008 | Weyerman ...................... | 705/35 |
| 2010/0241559 | A1 * | 9/2010 | O'Connor et al. ............. | 705/39 |
| 2010/0250424 | A1 * | 9/2010 | Torres ............................. | 705/37 |

* cited by examiner

*Primary Examiner* — Kirsten Apple
(74) *Attorney, Agent, or Firm* — Goldstein Law Offices, P.C.

(57) ABSTRACT

A social networking website system for an individual investor to join as a member, to meet online with other investors and discuss investing. The social network facilitates finding and communicating among like-minded individuals by providing the investor with a plurality of searching tools for searching a member profile page, a portfolio, and provides online communication tools such as a chat room, a forum and video posting. The member easily researches important information regarding stocks, commodities, bonds, foreign currency, futures, and other types of financial instruments by entering a ticker symbol that becomes a prefix key linking to an online data synopsis about the investment. The investor social networking system also provides a member a mechanism for placing orders to buy or sell financial instruments through the website.

20 Claims, 22 Drawing Sheets

INVESTOR SOCIAL NETWORKING WEBSITE

CROSS-REFERENCE TO RELATED APPLICATIONS

This application is a continuation-in-part of U.S. patent application Ser. No. 13/118,709, filed on May 31, 2011, which claims the benefit of U.S. Provisional Application No. 61/396,805, filed on Jun. 3, 2010. All of the above applications are incorporated by reference in their entirety for all purposes.

COPYRIGHT NOTICE

A portion of the present disclosure contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to an investment social networking system. More particularly, the present disclosure relates to an online investor social networking system that allows individuals interested in investing in stocks, commodities, bonds, foreign currency, futures, and other types of financial instruments to track their investments and discuss investing with other users that have a similar interest through a website. The investor social networking system also provides a medium for members to place orders to buy or sell financial instruments through the website.

BACKGROUND

In the past several years, social networking websites have changed from a fad used by a small number of technology-savvy individuals to some of the most trafficked websites with hundreds of millions of subscribers. Facebook®, the most popular social networking website, has become the second most frequented website in the world, after the search engine Google®. Social networking sites provide the opportunity to contact individuals throughout the globe quickly and easily with no investment other than a computer or a "smart" phone and an Internet connection.

Whereas most of the currently available social networking websites are directed towards personal use by allowing communication between individuals regarding friendships, dating status, photos, travels, and allowing professional networking such as found in the LinkedIn® network. There are no social networking sites directed towards investors interested in communicating with other investors, tracking their investments, researching investments, and buying or selling financial instruments. Investors must rely upon information in making informed decisions whether to buy, sell, or hold their financial instruments and require information regarding the price of stocks, which stocks or commodities are "hot," whether a new bond issue will take place, whether the value of a foreign currency will come up or down, etc. Serious investors are also interested in being able to buy or sell stocks, commodities, bonds, foreign exchange, futures, and other types of financial instruments easily.

Presently, social networking websites are directed towards facilitating personal relationships between individuals and at best, allow general professional communication. They are not directed towards investing and do not possess functionalities to most efficiently allow investors to communicate regarding their investments and portfolios. They also do not let investors obtain information regarding their financial instruments. Finally, they also do not allow actual trading of financial instruments.

Online trading of stocks, commodities, bonds, foreign exchange, futures, and other types of financial instruments are well known. These websites, however, do not allow an individual to communicate with other investors; at best, they allow communication with brokers and other professionals. Typically, they merely allow the purchase or sale of financial instruments and the individual purchaser must rely on information obtained from other sources, often not at the same time as making the transaction.

Accordingly, there is a need to address at least one of the above or other disadvantages.

BRIEF SUMMARY

It is an object of an example embodiment of the present disclosure to allow a user interested in investing to socially network online with other like-minded users who are also interested in investing. Accordingly, the present disclosure discloses an online social networking system for a user interested in discussing investing to join as a member to meet and communicate with other like-minded members through a social networking environment.

It is another object of an example embodiment of the present disclosure to provide educational tools for a user to learn more about investing, investment instruments, investment strategies, and financial matters generally. Accordingly, the present disclosure discloses an online social networking system for a member user, the system providing a framework for a plurality of educational media including on-line seminars, forums, e-books (electronic books) and publications to educate the member about investing.

It is a further object of an example embodiment of the present disclosure to allow a user to instantly find a synopsis of market data for an investment. Accordingly, the present disclosure discloses an online social networking system that provides a synopsis of market data whenever a user enters a ticker symbol for an investment within an application on the social networking system, such as in a chat room, a forum, or a mail application, the ticker symbol becoming a prefix key for linking to market data for the investment.

It is still a further object of an example embodiment of the present disclosure to allow a user to track data about the user's investments online in a plurality of display modes as well as share the data with other users. Accordingly, the present disclosure discloses an online social networking system that provides an online portfolio application, allowing the user to track data on the investments in the user's portfolio in a selective mode of display, such as in a quarterly chart, and allowing the user to share a portion of his portfolio with a plurality of other selected users, choosing what data to share with each selected user.

It is yet another object of an example embodiment of the present disclosure to allow a plurality of users to form an investing group. Accordingly, the present disclosure discloses an online social networking system that provides a group page, the group page having a group portfolio, the group page linking to a group member's page, allowing the group members to participate in the group's investments.

It is still another object of an example embodiment of the present disclosure to allow a user to share information about a market product to other users in an online community who are interested in investing. Accordingly, the present disclosure discloses an online social networking system that provides a user the ability to upload information about a market product onto a social networking website tabbed page that is accessible to all users in the online community.

It is still a further object of an example embodiment of the present disclosure to allow a user to perform research and place an order online for a plurality of stocks, commodities, bonds, foreign currency, and other financial instruments within the same website. Accordingly, the present disclosure discloses an online social networking system that provides links to an electronic trading system of a plurality of trading houses, such as brokers and dealers so that a user can place an order and the electronic trading system executes the order through a clearinghouse of the trading house.

An example embodiment of the present disclosure is a social networking website system for an individual investor to join as a member, to meet online with other investors and discuss investing. The social network facilitates finding and communicating among like-minded individuals by providing the investor with a plurality of searching tools for searching a member profile page, a portfolio, and provides online communication tools such as a chat room, a forum and video posting. The member easily researches important information regarding stocks, commodities, bonds, foreign currency, futures, and other types of financial instruments by entering a ticker symbol that becomes a prefix key linking to an online data synopsis about the investment. The investor social networking system also provides a member a mechanism for placing orders to buy or sell financial instruments through the website.

To the accomplishment of the above and related objects, the present disclosure may be embodied in the form illustrated in the accompanying drawings. Attention is called to the fact, however, that the drawings are illustrative only. Variations are contemplated as being part of the present disclosure, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 4:
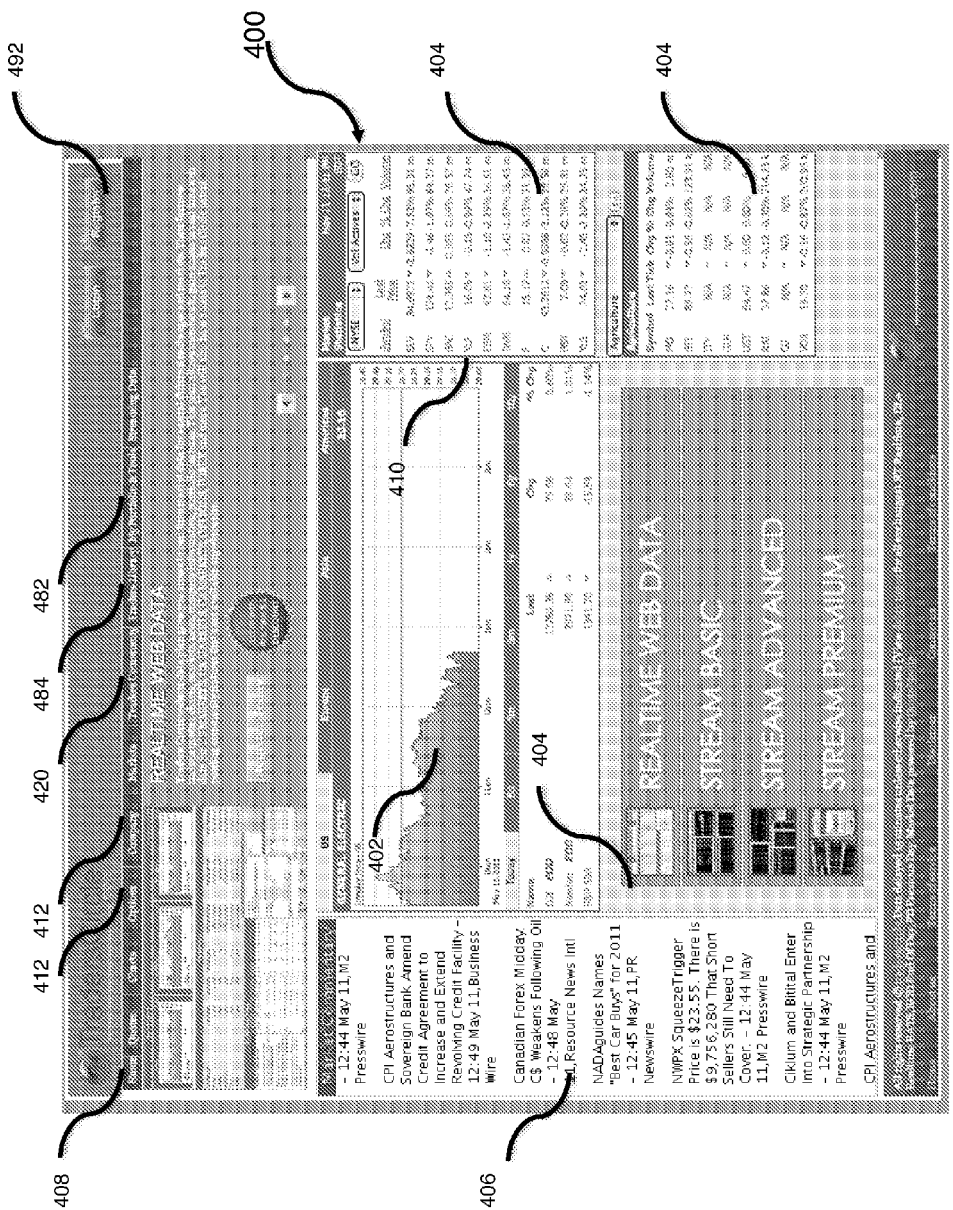
FIG. 4 is a display of an example embodiment of a home page of an investor social networking website according to the present disclosure.

FIG. 4 is a screenshot of an example login home page 400 for interfacing with an investor social networking system on a website, demonstrating an embodiment of the present disclosure. The login home page 400 displays financial information, such as a scrolling display of financial news 406, a graphical representation 402 of an equity or a financial market, and a plurality of tabular displays 404 of market statistics, such as a market or a market sector. Financial instruments are represented by a ticker symbol 410.

One unique and novel aspect of an example embodiment of the present disclosure is using the ticker symbol as a prefix key. Ticker symbols 410 are used in a lettering system to identify a specific financial instrument, such as, but not limited to, a stock, a mutual fund, an exchange-traded fund (ETF) as well as a sector of a financial market, such as for example, the banking sector, represented by "^BKX" or an interest rate such as "!FFUNDS" representing the federal funds rate.

Ticker symbols are well known to those of ordinary skill and beyond the scope of this discussion.

A prefix key is a key sequence that is associated with a keymap. A keymap extends the key sequence, creating an executable command, which in an example embodiment of the present disclosure, is a command to display in a new window, a data synopsis of the financial instrument represented by the ticker symbol prefix key 410. The command is executed when the user clicks the prefix key 410 directly. The prefix key functions as described wherever the key is displayed or entered by the user on the example website of the present disclosure, as described in greater detail below.

Referring to FIG. 4, the website has a plurality of tabs 412 for pull-down menus on a tool bar 408 for a user to selectively engage when browsing through the website. When a user joins the social networking network system, becoming a member, the user can access a plurality of functions through the pull-down menus on tabs. The tabs 412 include, for example, but not limited to, a quotes menu, a charts menu, a company menu, an options menu, a market menu and a portfolio management menu, allowing the user to access comprehensive, detailed and exhaustive information about a selected financial instrument, a selected market or market sector as well as manage an investment portfolio.

Unique to an example embodiment of the present disclosure, is the tab labeled "Traders Community" 420, which is a social network portal tab 420 for entering into the social network of the system. Through the "Traders Community" tab 420, the user enters the social network of users to exchange thoughts, opinions, ideas and feelings and communicate generally with other users about investing. The social networking system provides a plurality of tools for communicating, such as a plurality of chat rooms and forums, described in greater detail below. It is understood that the "Traders Community" is an example and non-limiting label for the social network portal tab 420 and the tab may be labeled by other names embodying the spirit of the present disclosure.

Figure 6:
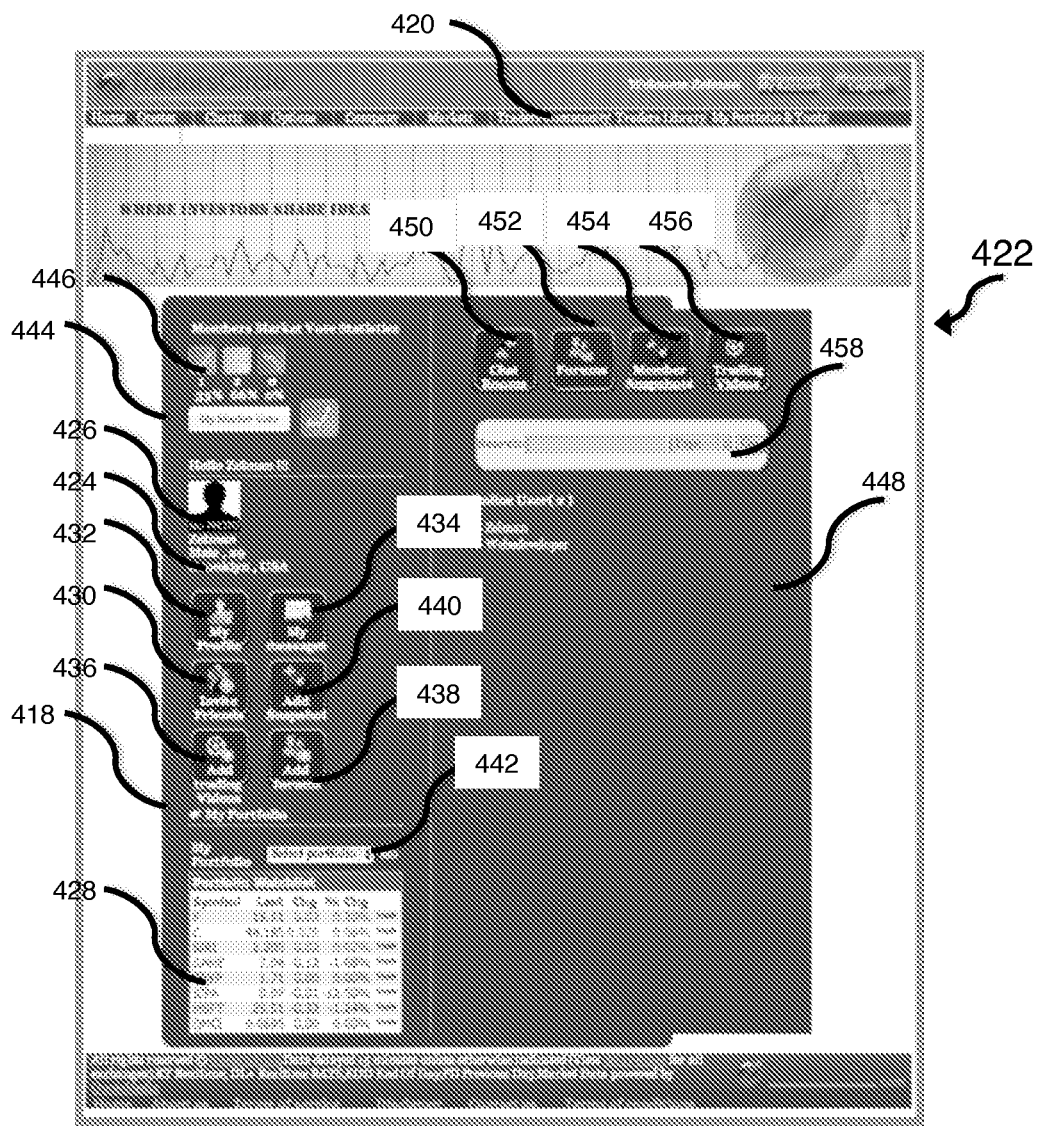
FIG. 6 is a display of an example embodiment of a portal page for entry into the social network of the system according to the present disclosure.

FIG. 6 shows the portal page 422 into the social network of the system. The user selects the tab 420 marked "Traders Community" to enter the portal. The portal page 422 is the hub for navigating the investor social networking website, introducing and connecting the user with other members. The portal page 422 displays a plurality of icons in a plurality of page segments, the user selecting an icon to engage directly or indirectly with other users or to create or modify the user's profile as explained in greater detail below.

To engage in the social network, the user establishes a profile, the profile having a plurality of segments, the profile displayed in a first segment 418 of the portal page 422. The segment displays a brief description of the user 424, which selectively includes a user name, a pictorial representation of the user 426, gender, age and residence of the user and a selected portfolio watch-list 428 of the user.

The user may establish multiple watch-lists of the financial instruments the user holds or is interested in following, the user selecting the watch list from a pull-down menu 442. The user selectively names the watch-list 428 either by classification, such as the sector, investment type or some other identifying characteristics. The watch-list is searchable by other users, so that the user can find a second user with interests in the same financial instrument. When the user finds the second user with the same interest, the user sends a request to become a "friend," selecting the icon 430 for inviting friends.

The portal page has icons, for example, but is not limited too, editing the user's profile icon 432, email icon 434 for reading and sending email messages sent through the social network, adding a video icon 436, adding a forum icon 438 and posting a snapshot icon 440, the snapshot, a graphical representation of a financial instrument performance fixed in time, the video, the snapshot, and the friend added to the user's profile.

The portal pages also has a second segment 444, the second segment having poll icons 446, the user selectively chooses to indicate the user's outlook, for example, but not limited to, on the market, on the economy, the selected icon graphically communicating the outlook to other users.

The portal page 422 has a third segment 448 for entering the social network. The user selects icons in the third segment 448 on the portal page to enter the social network. The user selects the icon that connects the user to, for example, but not limited to, a chat room icon 450, a forum icon 452, a financial instrument snapshot icon 454, or a trading video icon 456.

After entering the social network through the portal page, interacting with other users directly or indirectly in the social network, the ticker symbol prefix keys function to open a display of a data synopsis for the associated financial instrument.

Figure 5:
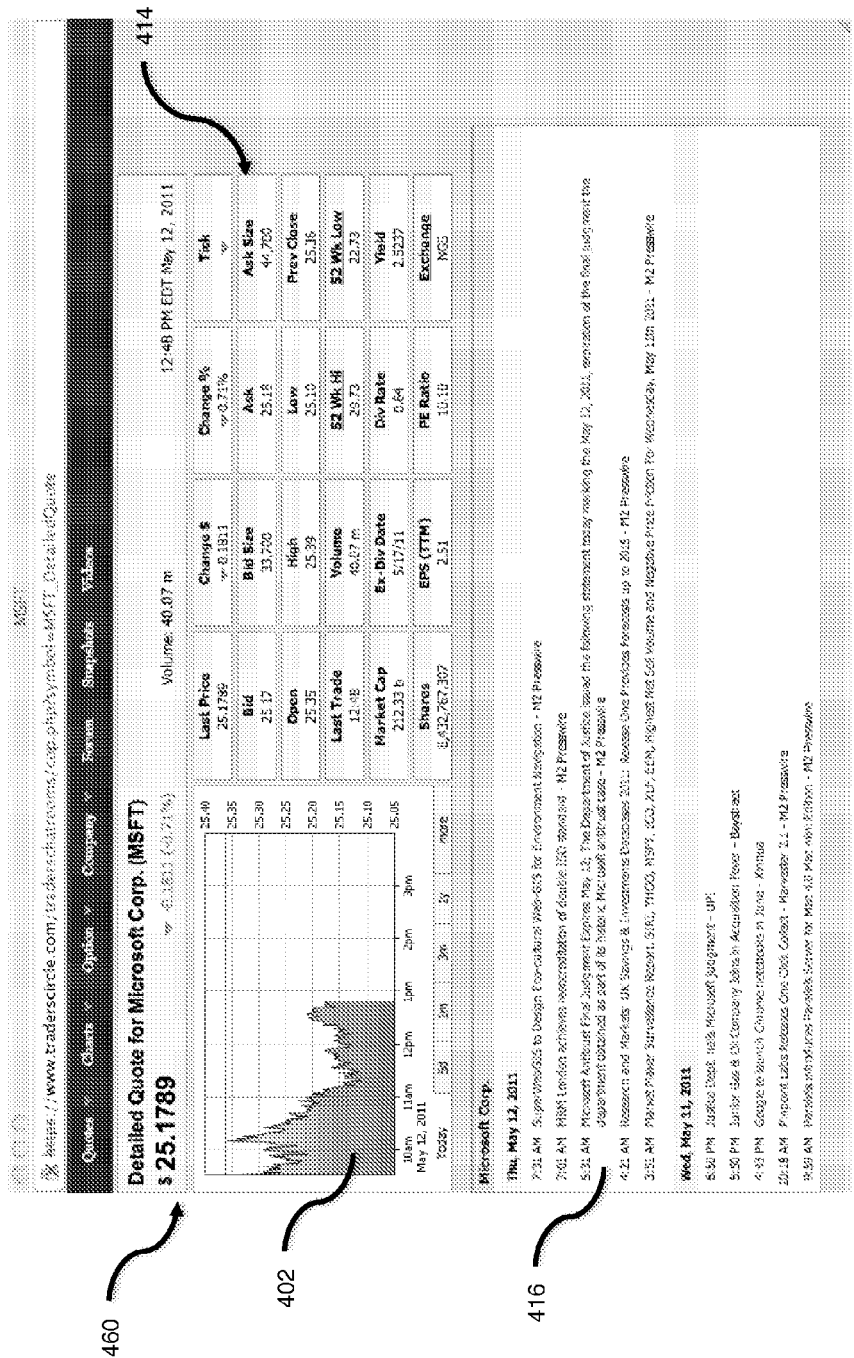
FIG. 5 is a display of an example embodiment of a synopsis of financial data for a financial instrument, namely Microsoft Corporation common stock, according to the present disclosure.

FIG. 5 shows an example data synopsis display 460 that will be used throughout this discussion.

Figure 7:
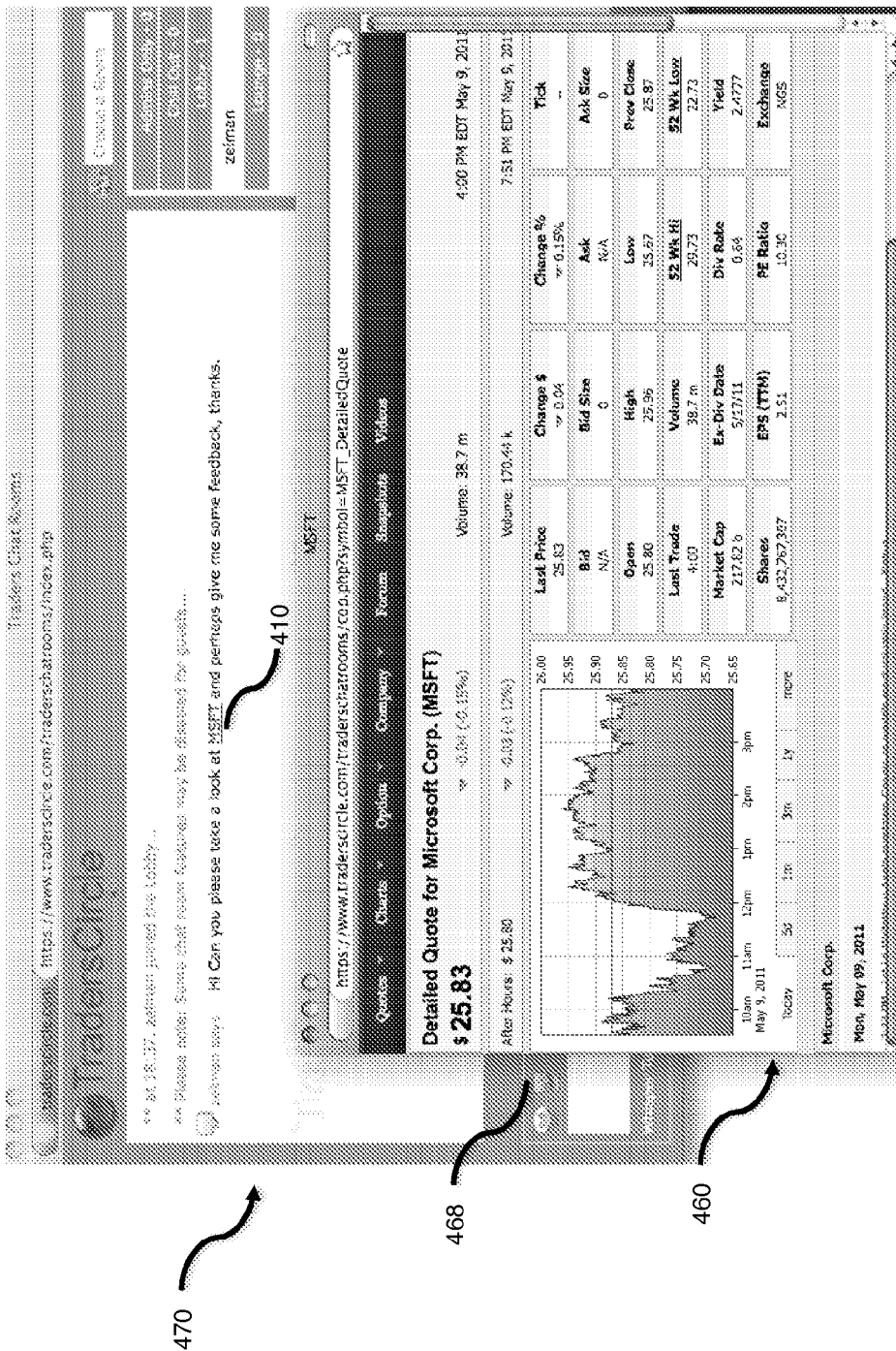
FIG. 7 is a display of an example embodiment of an online chat in progress in a background window with the example data synopsis display in a foreground window, the data synopsis called up by a prefix ticker symbol in the online chat according to the present disclosure.

FIG. 7 shows an example of a chat in progress in a chat window 470 in a chat room. A chat room, which is well known to skilled artisans, is typically an electronic venue for users to participate in a conversation online in real time by a first user entering text that is seen in a display window by other users, who in turn, enter text in the display window in response.

In the investor social network system, the user asks other users for an opinion about a financial instrument, such as in the example shown, Microsoft Corporation, represented by the ticker symbol MSFT. The user enters the "MSFT" symbol 410 and other users in the chat room click on the ticker symbol prefix 410 and a second window displays the data synopsis 460 for Microsoft Corporation. It is understood by those of ordinary skill, that clicking is the action of the user moving a cursor to a certain location on a screen with an input device, such as, for example, but not limited to, a mouse, a stylus, a joystick, or a finger, and selecting by a means associated with the input device.

Figure 7A:
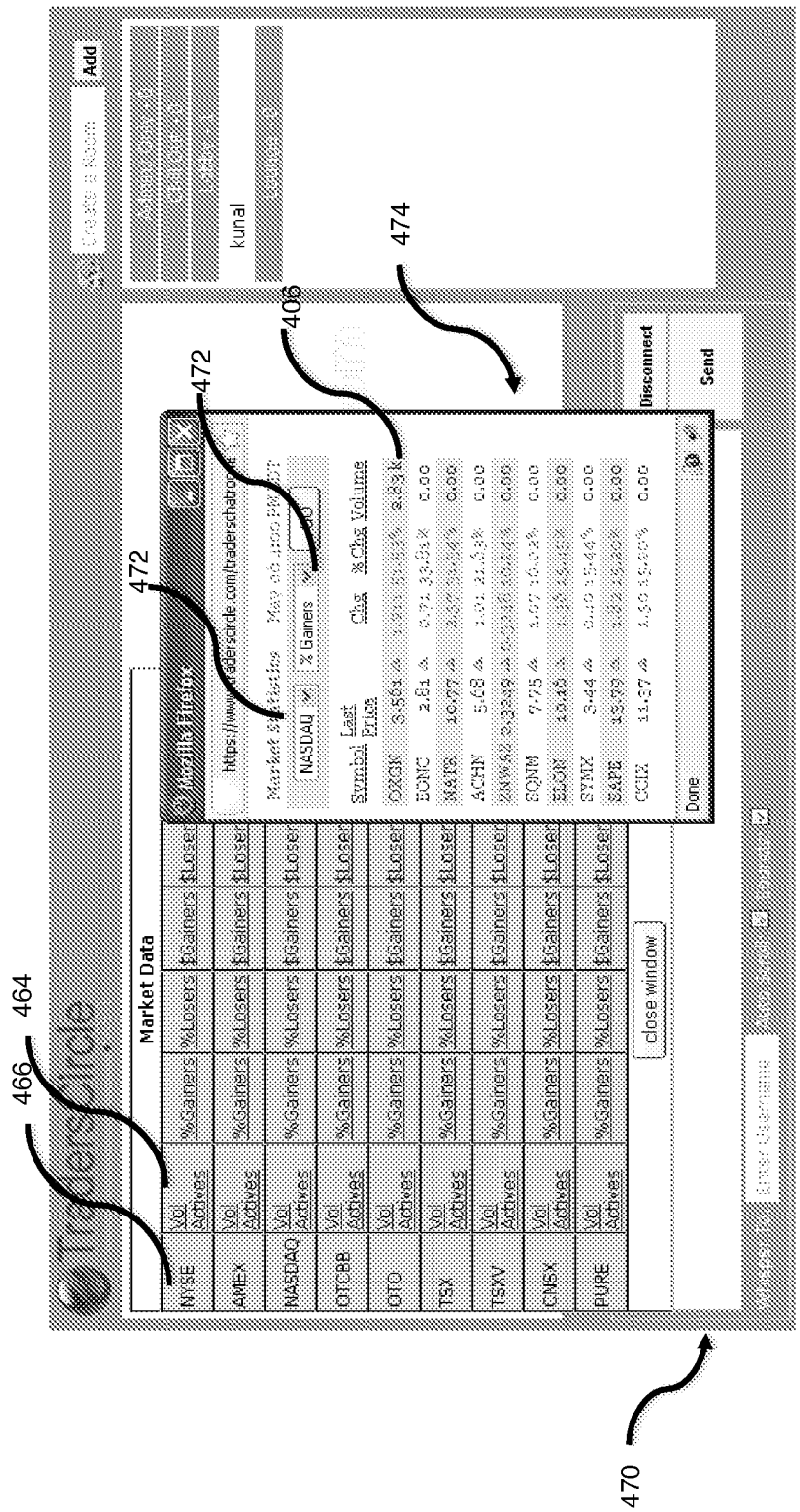
FIG. 7A is a display of the example online chat in progress in a background window with market status data display in a foreground window, the market status data called up by a hotkey in the chat window according to the present disclosure.

In one embodiment, unique to the investor social network chat room are market icons 468 that link to status of different financial market such as NYSE (New York Stock Exchange) or NASDAQ (National Association of Securities Dealers Automated Quotations), different market sectors, different currencies and other typical financial data, displaying real-time or slightly delayed market status. The statuses, shown in FIG. 7A, are displayed in tabular form of a plurality of columns and rows, a first column 466 the name of the market, a second column 464 containing a plurality of hotkeys, one hotkey associated with each market. When the user clicks on the selected hotkey, a new display window opens for the selected market. The user selects from a pull-down menu 472, a list 474 of gainers or losers, based on different criteria or selects to look at a different market. The user continues the chat in the chat window 470 while reviewing the list 474.

Figure 8:
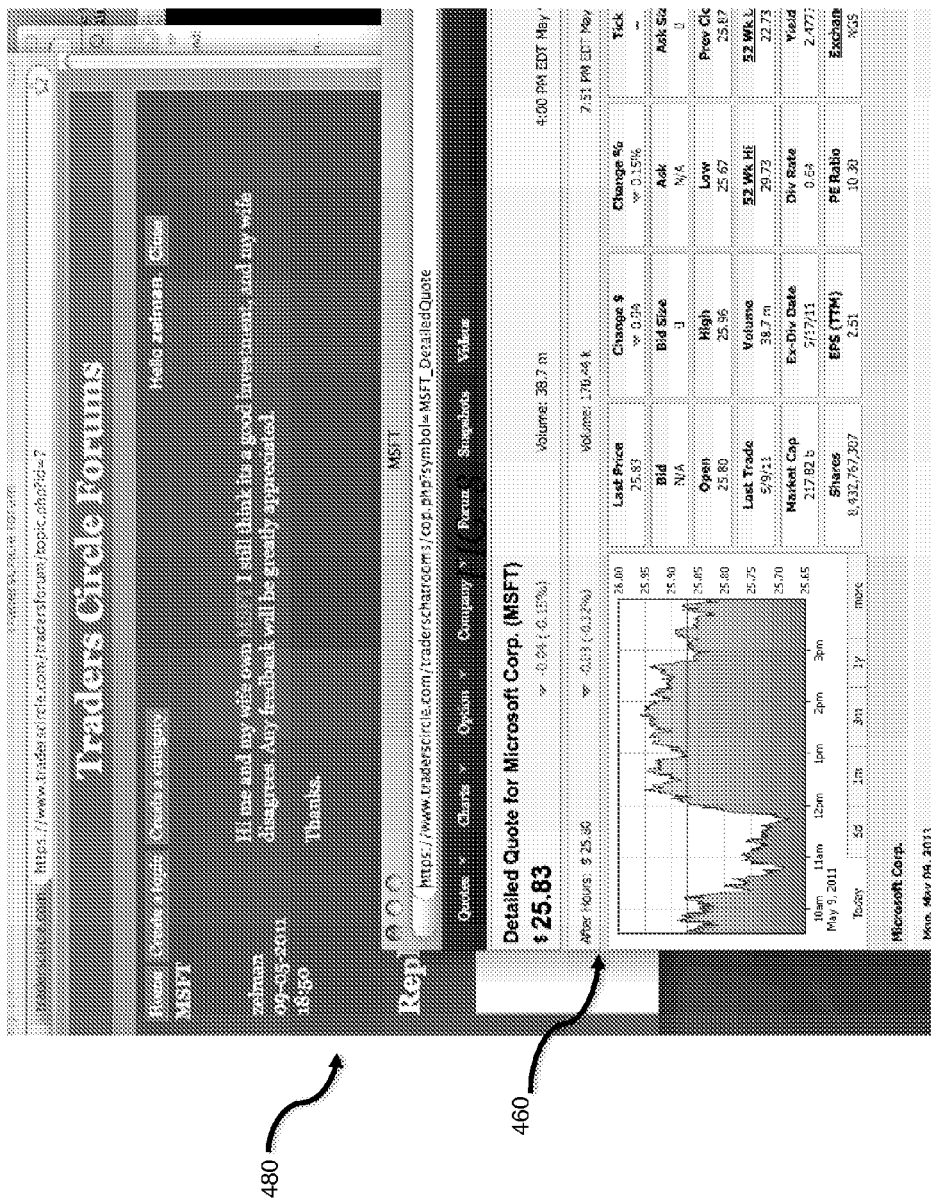
FIG. 8 is a display of an example embodiment of an online forum in progress in a background window with the data synopsis display in a foreground window, the data synopsis called up by the prefix ticker symbol in the online forum according to the present disclosure.

FIG. 8 shows a forum page 480 where there is an ongoing discussion about a topic, which is in this example is Microsoft Corporation. The prefix symbol MSFT 410 is displayed in the forum. A forum is where messages are posted by the first user and viewed by and selectively responded to by other users over a time and are well known to those of ordinary skill. The user clicks on the symbol 410 and a second window displays the data synopsis 460 for Microsoft Corporation. The prefix symbol 410 connects the user to the associated data synopsis 460 wherever the symbol 410 is displayed in the social network function entered through the portal page shown in FIG. 6.

FIG. 5 shows the data synopsis 460 in detail, again using Microsoft Corporation as a non-limiting example. The window displays a graphical representation 402 of the trading price over a selected time interval, a tabular display 414 of a plurality of financial data such as, for example, but not limited to, current trading price, volume, important financial rations, dividend rate and other data typically considered by an investor. Below the chart 402 and data display 414 are a plurality of headlines 416 for news stories about the associated symbol with links to the full stories, which the user can post to the user profile, post a link in the forum, email to a second user, all by using the social network email function. The email function is well known to those of ordinary skill and a detailed discussion of how it functions is beyond the scope of this discussion.

Figure 9:
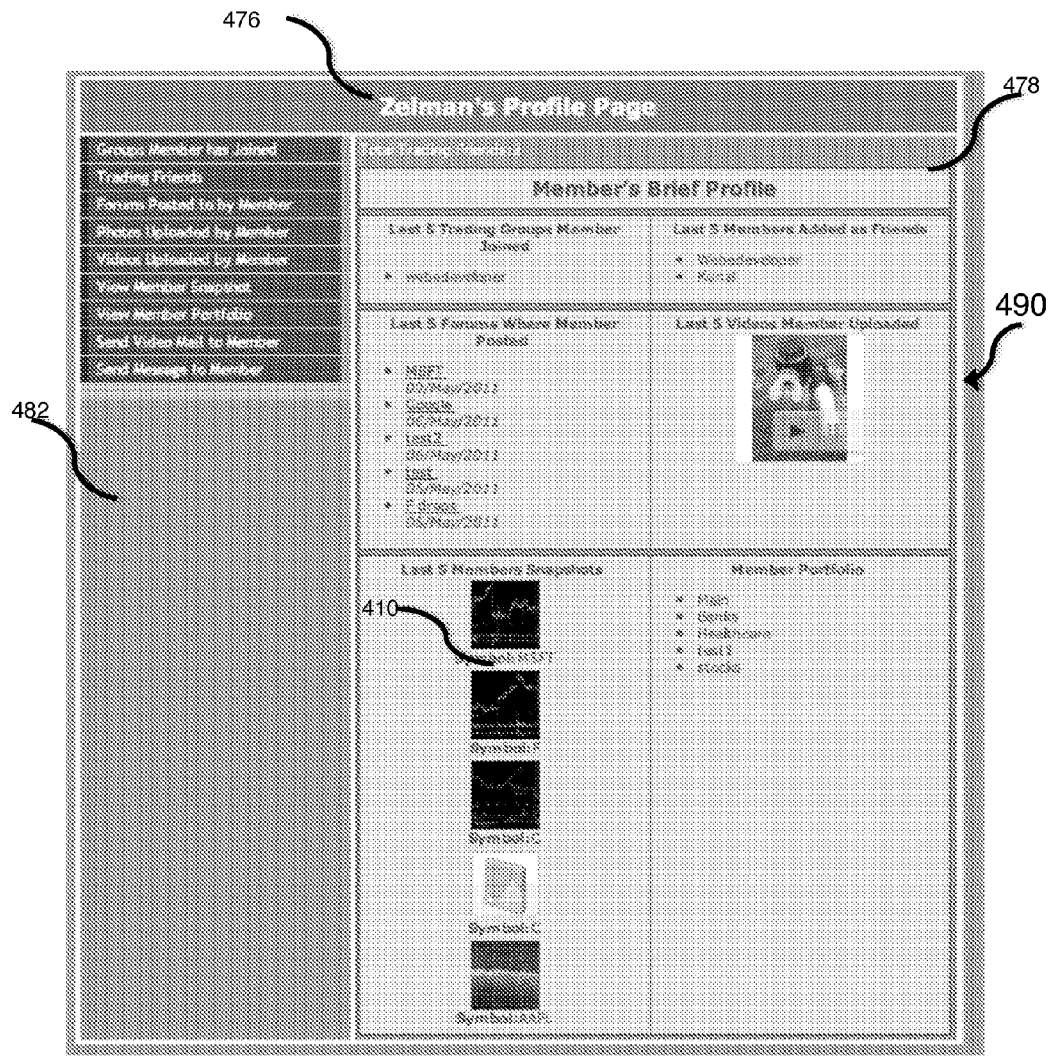
FIG. 9 is a display of an example embodiment of a profile page for the user according to the present disclosure.

A further example of the prefix symbol 410 is shown in FIG. 9, displaying content of the user profile page 490 within the investor social network. The user name 476 is displayed at the top of the profile page 490. The profile page has a pair of segments for displaying details about the user's online social network.

A first segment 478 displays a summary of the recent activity of the user referred to as a brief profile. The last five trading groups the user joined appear, as well as the last five friends added, the last five forums where the user posted, the last five videos the user uploaded, as well as the last five snapshots the user created. Throughout the brief profile segment 478, when the ticker symbol appears, then the ticket symbol is the prefix symbol, functioning as described above. The user profile page allows viewing of the full member profile in a second segment 482, including, for example, but not limited to, all the groups the user has joined, all trading friends, all forums posted to the user, all videos uploaded by the user, the user's watch lists and portfolio. The second segment allows, but is not limited to, the sending of video mail or message to a second user. Throughout the functions accessed through the portal page of the social network described above, as well as other typical social network functions, that are well-known to those of ordinary skill and beyond the scope of this discussion, the prefix ticker symbol 410 links the user to the associated data synopsis wherever the ticker symbol appears.

A user joins the investor social network by selecting the register button and filling out an on-line form, with basic biographical information. The user selects a level of service and a method of payment, the level of service determining the speed of market data delivered to the user by the website, the higher level of service streaming real time data, the lower level of service streaming with a slight delay. In another example embodiment, the higher level of service is both streaming realtime data and non-streaming realtime data, the lower level service streaming with slight delay and non-streaming with slight delay.

Figure 10:
FIG. 10 is a display of an example embodiment of a portfolio listing for the user according to the present disclosure.

Referring to FIG. 4, the user accesses the user's online portfolio through the tool bar 408 by clicking on portfolio tab to view current holdings. In another example embodiment, when a user clicks on the homepage, then the user is taken back to their page and their full profile. The current market position for each financial instrument is displayed in a tabular portfolio listing 486, as shown in FIG. 10. Each financial instrument tabular listing is by ticker symbol 410 and thus is a prefix key to link to the associated data synopsis.

Each financial instrument listing has a trading button 488 so that when a user clicks on the button, the user directly enters into a trading website of a selected trading house, the user selectively placing an order to buy or sell the financial instrument, the selected the trading house executing the order. A trading house is a financial institution, such as an investment bank, brokerage or trader, allowed by law to execute financial transactions such as, buying and selling financial instruments. The direct trading button 488 from the online portfolio listing 486 to the trading house allows the user to quickly place an order in response to analysis of data gathered through research and the investor social network.

The portfolio, when accessed from the tool bar by the user, shows a number of shares and a purchase price for each listing. Only the user can view his or her own portfolio listing 486 with these data. The user selectively chooses how much of the portfolio data is shared with the second user, the user having the ability to limit as well as grant a plurality of levels of access to other users, setting the access level for each user who is a friend in the social network.

Referring to FIG. 4, a user joins the investor social network by selecting the register button 492 and filling out an on-line form, with basic biographical information. The user selects a level of service and a method of payment, the level of service determining the speed of market data delivered to the user by the website, the higher level of service streaming real time data, the lower level of service streaming with a slight delay. A user selects also membership as a user or as an educator. In another example embodiment, the user can also select membership as a non-professional or a professional member. In another example embodiment, the higher level of service is both streaming realtime data and non-streaming realtime data, the lower level of service streaming with slight delay and non-streaming with slight delay.

Once a user joins the social network, the user has a choice to join a group and the user can selectively join at least one group. Groups can have group profile pages accessible to other members, similar to profile pages for individual users. Groups are formed for investing clubs, where individual pool resources and invest as one entity or by clients of a trading house.

The group webpages are maintained by a group owner. Group members have full access to the group profile page and portfolio. The group owner accepts or rejects a request to join the group. The group profile page allows viewing the last five users added to the group, the last five forums where the group owner posted, the last five videos the group uploaded, as well as the last five snapshots the group created. The group profile page allows viewing of the full group profile, including, for example, but not limited to, all the members of the group, all forums posted to the group, all videos uploaded by the group, the group's watch lists and portfolio. The group owner presents audio and video seminars on investment topics by streaming audio and video content or by uploading audio and video files; the group owner selecting whether the seminars are accessible by group members only or open to all users of the investor social network.

Referring to FIG. 4, the user accesses a library of educational materials, such as video, audio and text that explain trading and financial markets through a library tab 484 on the tool bar 408.

In addition to the library, users learn about investing through the social network of the system. Expert investment professionals, either independent or from trading houses join the social network as an educator and post video and audio content to users. The educator member has a plurality of different access and privileges than a user. The social network system provides access to experts and trading houses worldwide as educator members to present audio and video seminars on investment topics by streaming audio and video content or by uploading audio and video files. The social network also provides contests for users, challenging users to create portfolios meeting contest criteria. Other users view a winning portfolio to learn a plurality of different success strategies for investing.

Those of ordinary skill in the art will understand that the illustrative window displays are to be interpreted in an example manner and that displays different from those shown and described herein can be used within the scope of the present disclosure. For example, features of the displays can be combined, separated, interchanged, and/or rearranged to generate other displays.

Figure 1:
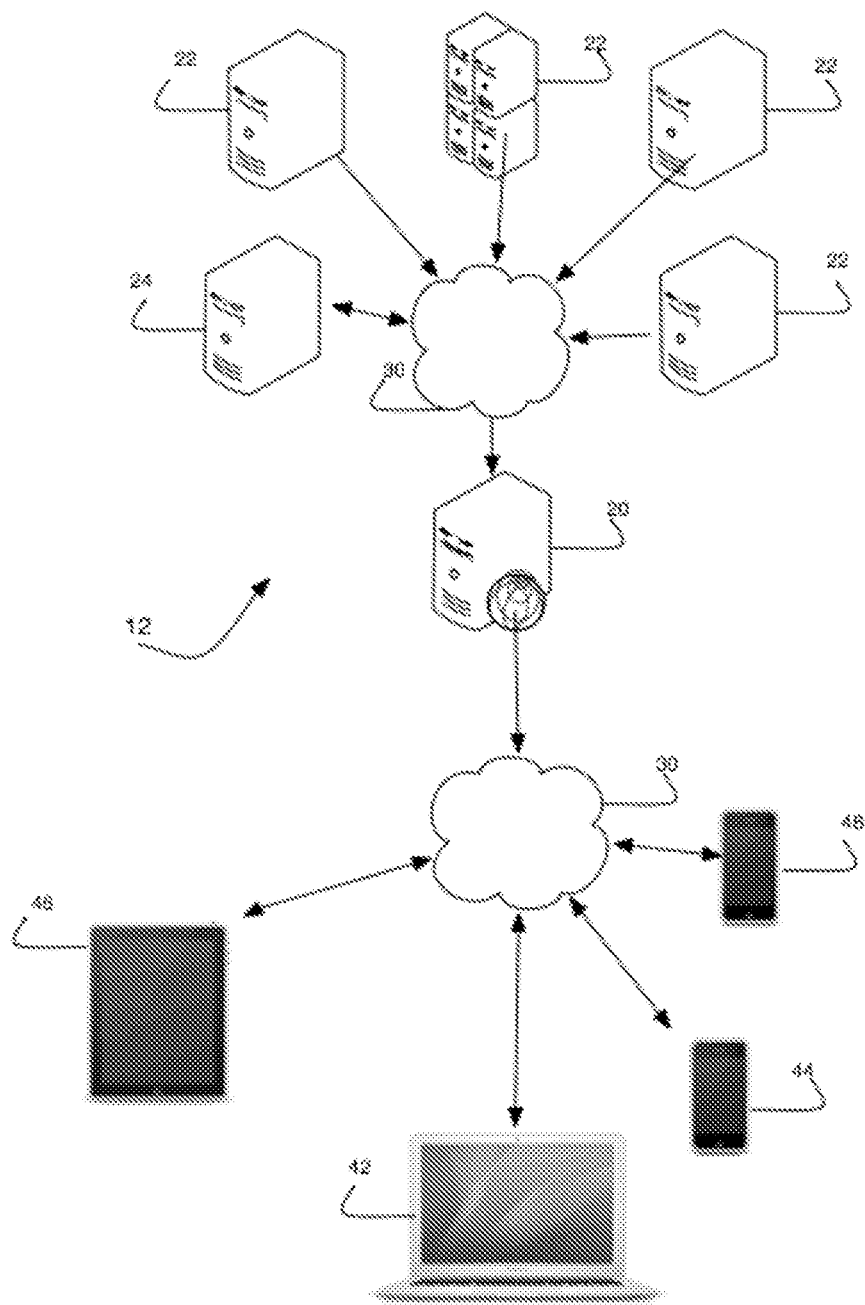
FIG. 1 is a schematic diagram of an example embodiment of an investor social networking system according to the present disclosure.

An example embodiment of the investor social networking system 12, as shown in FIG. 1, has a plurality of software systems and software applications residing typically on at least one system server 20 networked to the Internet 30, the system server 20 linking to at least one user running a software client application on a personal computing device, that allows the user to connect to the Internet 30 and access the social networking system on the system server 20. The personal computing device is, for example, but not limited to a personal computer 42, a smart phone 44, a tablet computer 46, or a personal digital assistant (PDA) 48.

The configuration and interconnection of such network and personal devices can of course be varied, and substituted with other technologies both presently available and subsequently available, while adhering to the principles of the present disclosure. The network server 20 connects both to the personal computing device 42, 44, 46, 48 of the user and to a plurality of servers 22 on the Internet 30, the other servers 22 providing financial information to the server 20 of the system and the means to order financial transactions, the server of the system aggregating financial information and transmitting the aggregated financial information to the personal computing device of the user 42, 44, 46, 48, when the user selectively requests financial information. The system server 20 provides a secure link to a network server 24 of a financial institution, such as, for example, but not limited to, a trading house, a brokerage, a dealer, or a bank, that executes financial transactions so that the user can place an order to buy or sell a financial instrument while using the financial social networking website.

Figure 2:
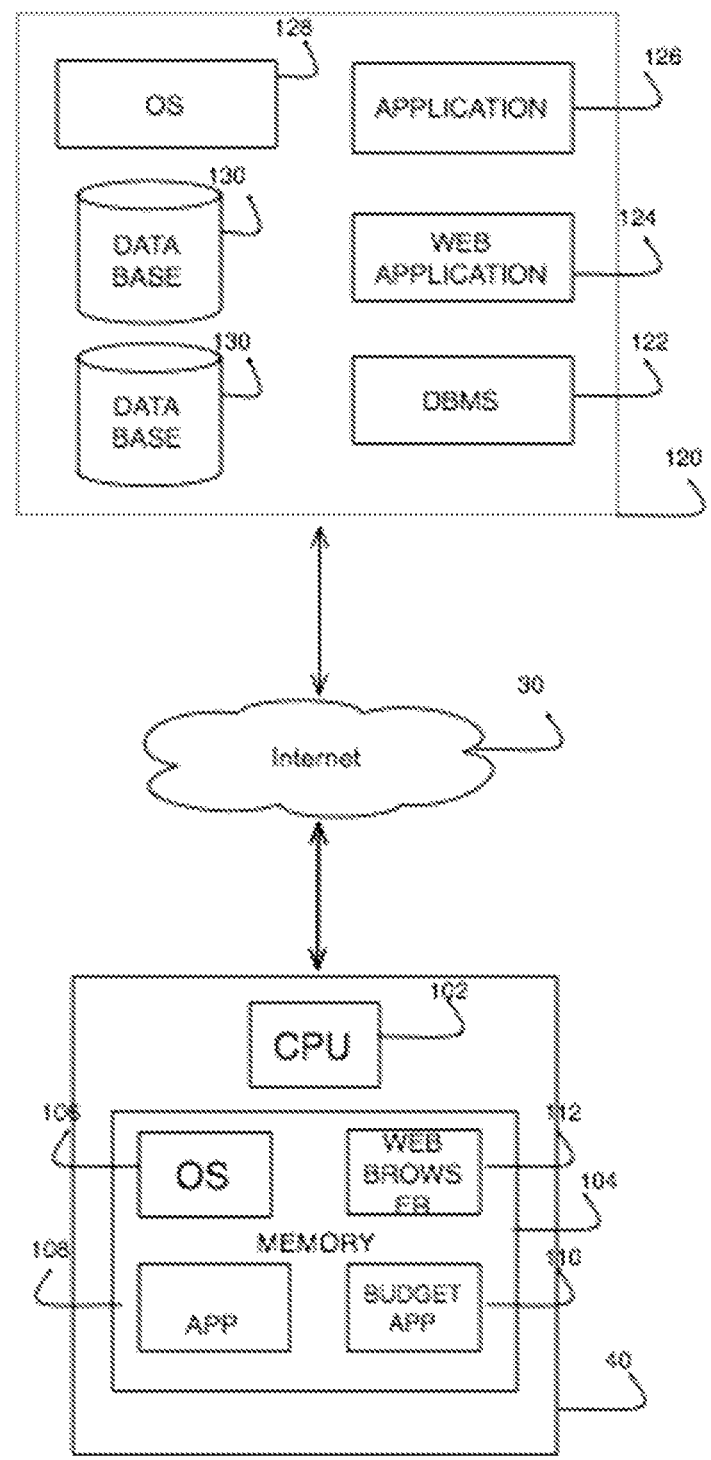
FIG. 2 is a block diagram of an example embodiment of a system server in the social networking system connecting to a user on a personal computing device according to the present disclosure.

FIG. 2 shows a schematic diagram of an example embodiment of the system server 20 connecting to the personal computing device of the user. The system server 20 has software for operating the system that includes, but is not limited to, an operating system 128 with communications software for connecting to the Internet 30, drivers and other software utilities necessary for the server to operate, which is well known to those of ordinary skill and the details of which are beyond the scope of this discussion. The system server also has a plurality of storage devices 130, including, for example, but not limited to, storage devices 130 for maintaining a membership database and archiving financial information and includes a database management tool 122 that stores, sorts and retrieves data from the storage devices 130. It is also understood by those of ordinary skill that the system server 20 is not limited to a single device, but can be multiple devices electronically connected and operating together to perform a plurality of functions of the system server, such as in a distributed server network.

The system server 20 of FIG. 1 can have a software application 126 of FIG. 2 of an example embodiment of the present disclosure, the software application connecting to the Internet 30, serving the pages as described herein to the user with the functions described herein, the functions associated with the pages. The software application 126 of an example embodiment of the present disclosure receives and collects financial information from other servers connected to the Internet, sorting, selecting and displaying the financial information in a formatted display selected by the user.

FIG. 2 shows the personal computing device 40 of the user used to invoke the investor social networking system. The personal computing device has a central processing unit (CPU) 102, memory 104 and software for operating the system that includes, but is not limited to, an operating system 106 with communications software for connecting to the Internet 30, and other software utilities necessary for the device to operate, which is well known to those of ordinary skill and the details of which are beyond the scope of this discussion.

The personal computing device has a web browser 112 that when the device connects to the Internet 30, the browser retrieves selected pages of the investor social networking system website, allowing the user to interact with the system, by providing the means to enter data into the system and the means to display the selected pages of the website of the system.

Optionally, the personal computing device has an "app" 108 for connecting directly and specifically to the investor social networking system. The "app" is a software application that performs the tasks required to interact with the investor social networking system, the app 108 adapting the means of entering data and displaying the selected pages for the specific personal computing device. The personal computing device optionally has a personal financial software application 110, such as the non-limiting examples, QUICKEN® or iBANK®. The investor social networking system allows the data in the personal financial software application 110 to be uploaded as a means to create an online portfolio.

Figure 3:
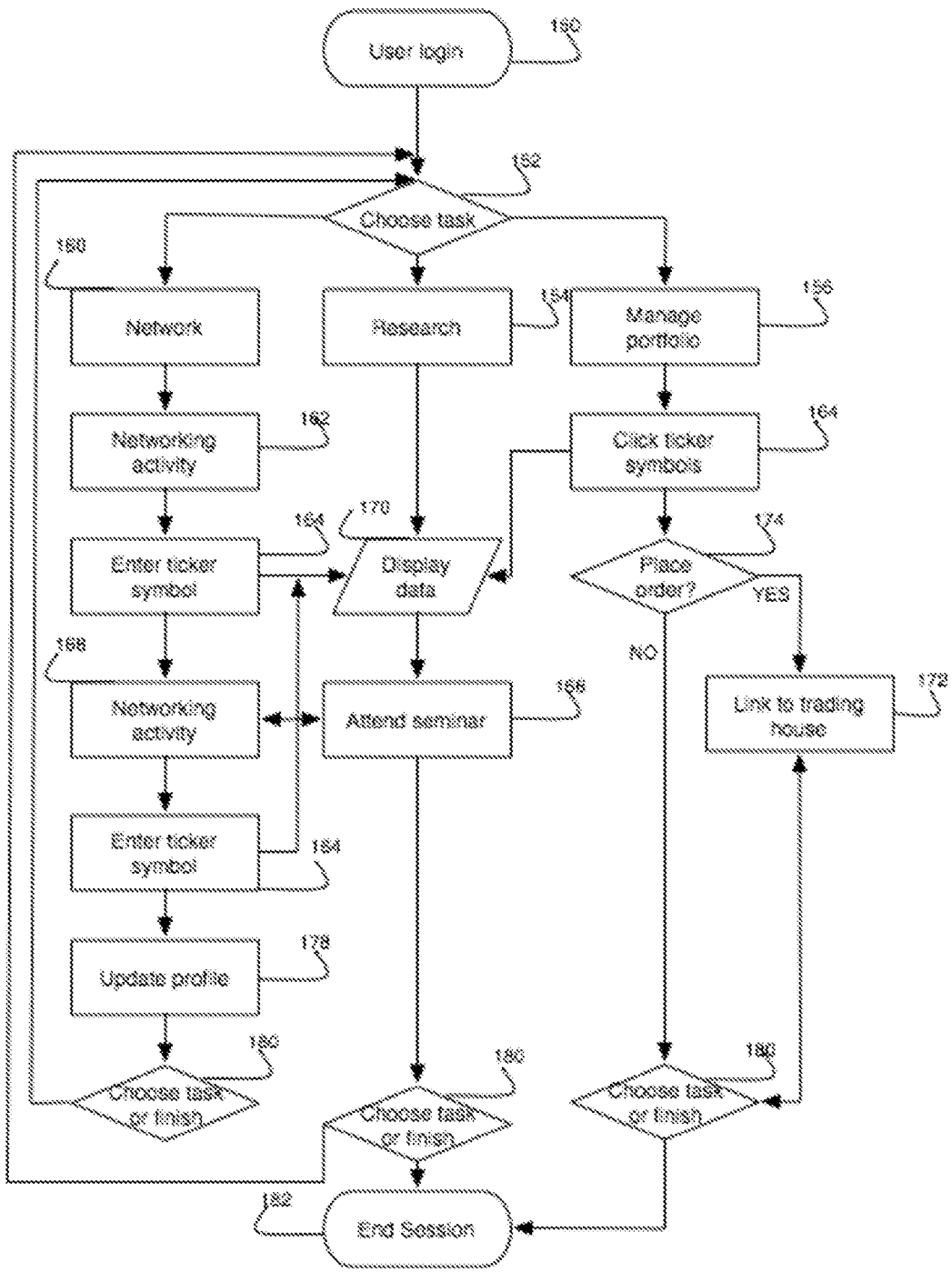
FIG. 3 is a flow chart of an example embodiment of user actions in the investor social networking system according to the present disclosure.

The user visits the website of the investor social networking system as shown in FIG. 3. If the user is a member, the user securely logs into the system 150 to access the selected functions of the website. The user has access based on a selected level of membership chosen at the time of enrollment as described herein. The user selects a task 152, such as researching financial instruments 154, managing the user's investment portfolio 156 or engaging with other users directly or indirectly in the social network 160 of the system. The system allows the user to move between the tasks easily and seamlessly.

In one example, the user researches 154 a financial instrument by selecting from the pull-down menus the data desired and entering a ticker symbol into a search box. The system displays the data 170. The user may continue to research 154, and for example, search for data on the market sector of the financial instrument.

After reviewing the research, the user goes to the social network 160. Using the social networking tools, the user goes to a networking activity, such as the chat room 162 and begins chatting with another user. During the chat, the users use the ticker symbol prefix 164 to refer or research the associated financial instrument. After the research is displayed 170, the user decides to either buy or sell the financial instrument discussed in the chat and moves to portfolio management function 156.

The user reviews the financial instrument data by clicking on the symbol 162 and decides to place an order 174 to be executed by a brokerage or trading clearinghouse by clicking on the trading link 172 in the portfolio listing. After placing the order, the user chooses 180 to return to the social network 160, research 154, moving back and forth between the functions.

While researching, the user chooses to attend an online seminar 166. While engaging in a second networking activity 168, such as a forum, the user learns about an online seminar and chooses to attend the seminar 166. While in the forum, the user wishes to learn more about a financial instrument that is discussed in the forum. The user clicks on the ticker symbol and the system displays the data 170.

When the user complete networking activities, the user updates the user profile 178. After updating the user profile, the user chooses 180 to research, manage the user's portfolio or continue networking. When the user decides to stop researching financial instruments, managing the user's investment portfolio and engaging in the social network of the system, the user is finished and logs off the system and ends the session 182.

Figure 11:
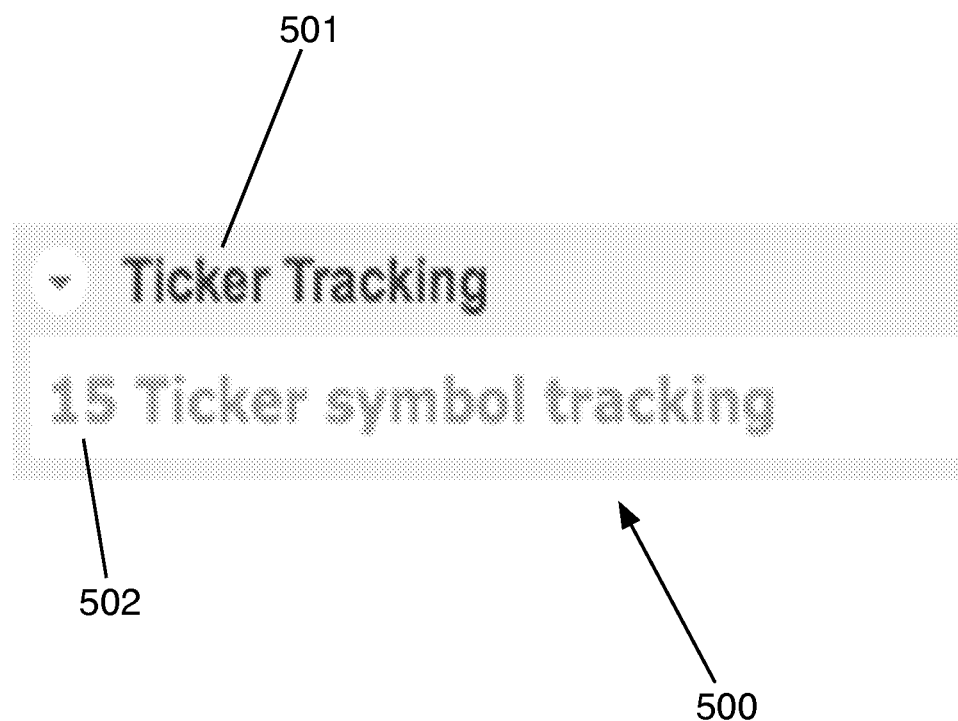
FIG. 11 is a screenshot of an example embodiment of a ticker tracking element according to the present disclosure.

FIG. 11 is a screenshot of an example embodiment of a ticker tracking element according to the present disclosure.

On system 12, users can follow system 12 events associated with preselected ticker symbols via the prefix key, which can be a specific format of alphanumeric text, such as a string of capital letters. This type of following can occur via events such as content posted on message forums, associated with snapshots, associated with videos, news, friends' pages and personal pages. For example, when the user posts a message having a certain ticker to the forum or posts a snapshot or a video associated with or having the ticker, then all users of system 12 who are following that ticker will automatically receive a notification of such post. The notification includes a link to such post in a section of system 12 where the post was made.

Similarly, when a plurality of relationships exist among users in social networking system 12, such as when users are socially networked to each other to be friends, and someone, such as a third party, posts a message about a certain ticker on any of those user's pages, then both users will receive notifications stating that a new posting related to the certain ticker was posted on that user's page or friend's page. However, other users who are lack such relationships will not receive such notifications. Likewise, if the third party or someone else posts a message about a certain ticker on the third party's page, then other users who lack social relationships with the third party will not receive such notifications.

A ticker tracking element 500 displays a name 501 and a number 502. Name 501 is a name for element 500. Number 502 is a numerical value corresponding to a number of tickers that a user of system 12 is following. Number 502 can be any numerical value. Element 500 is used in system 12 as described herein.

Figure 12:
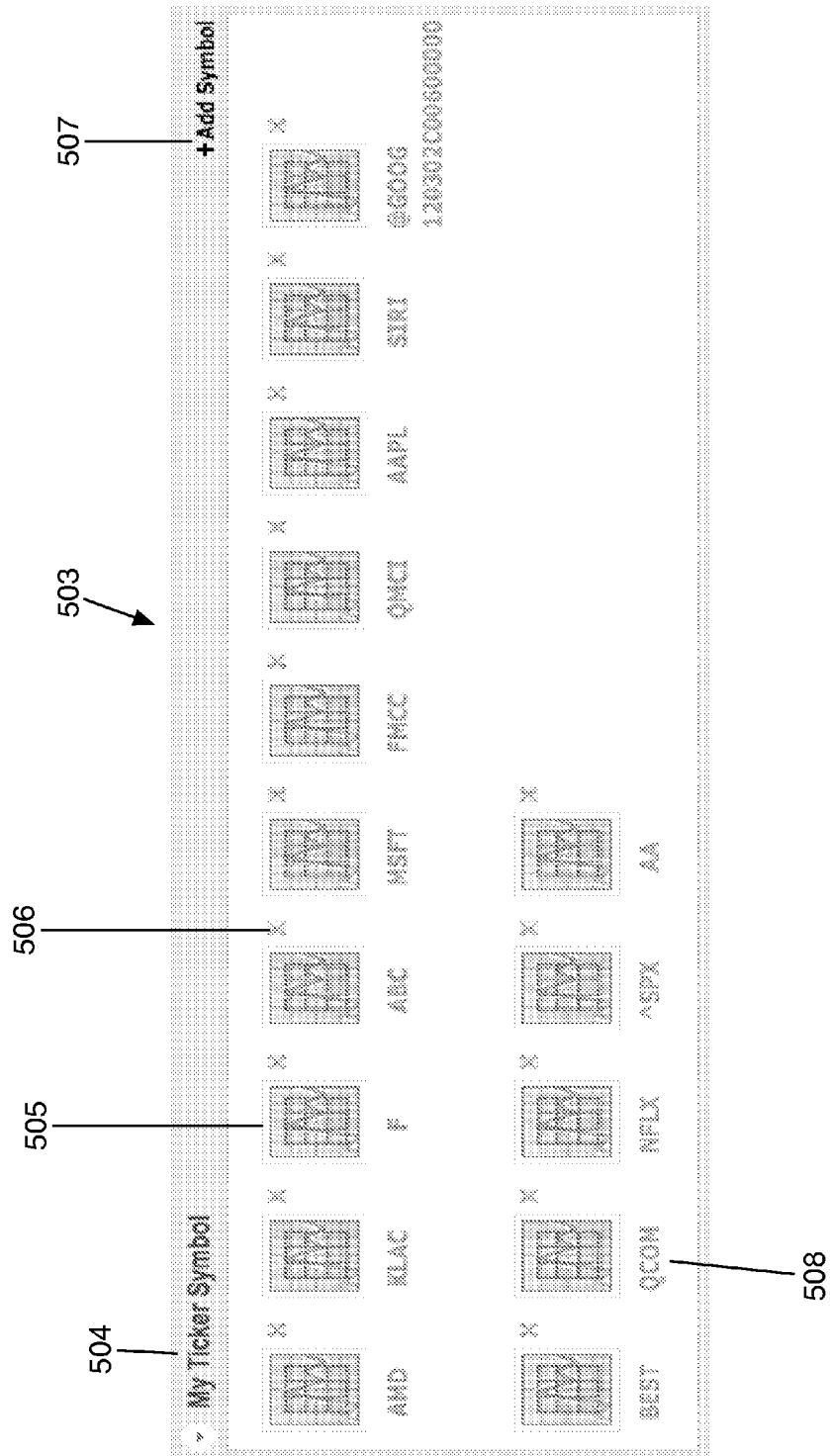
FIG. 12 is a screenshot of an example embodiment of a list of tracked tickers according to the present disclosure.

FIG. 12 is a screenshot of an example embodiment of a list of tracked tickers according to the present disclosure.

Upon clicking element 502, as shown in FIG. 11, a list 503 is displayed, thus allowing the users of system 12 to know all ticker symbols the users are following. List 503 displays name element 504, a ticker element 505, a remove ticker element 506, an add symbol element 507 and a ticker name element 508. Name element 504 is a name of list 503. Ticker element 505 is a clickable icon corresponding to the ticker, which upon clicking or a mouse-over can display a snapshot corresponding to the ticker. Remove ticker element 506 is a clickable icon, which upon clicking removes the ticker from list 503. Add symbol element 507 is a clickable icon, which upon clicking adds a new ticker to list 503. Ticker name element 508 is a alphanumerical code corresponding to the ticker, which can be a stock or an option or any other trackable financial instrument or an index.

Figure 13:
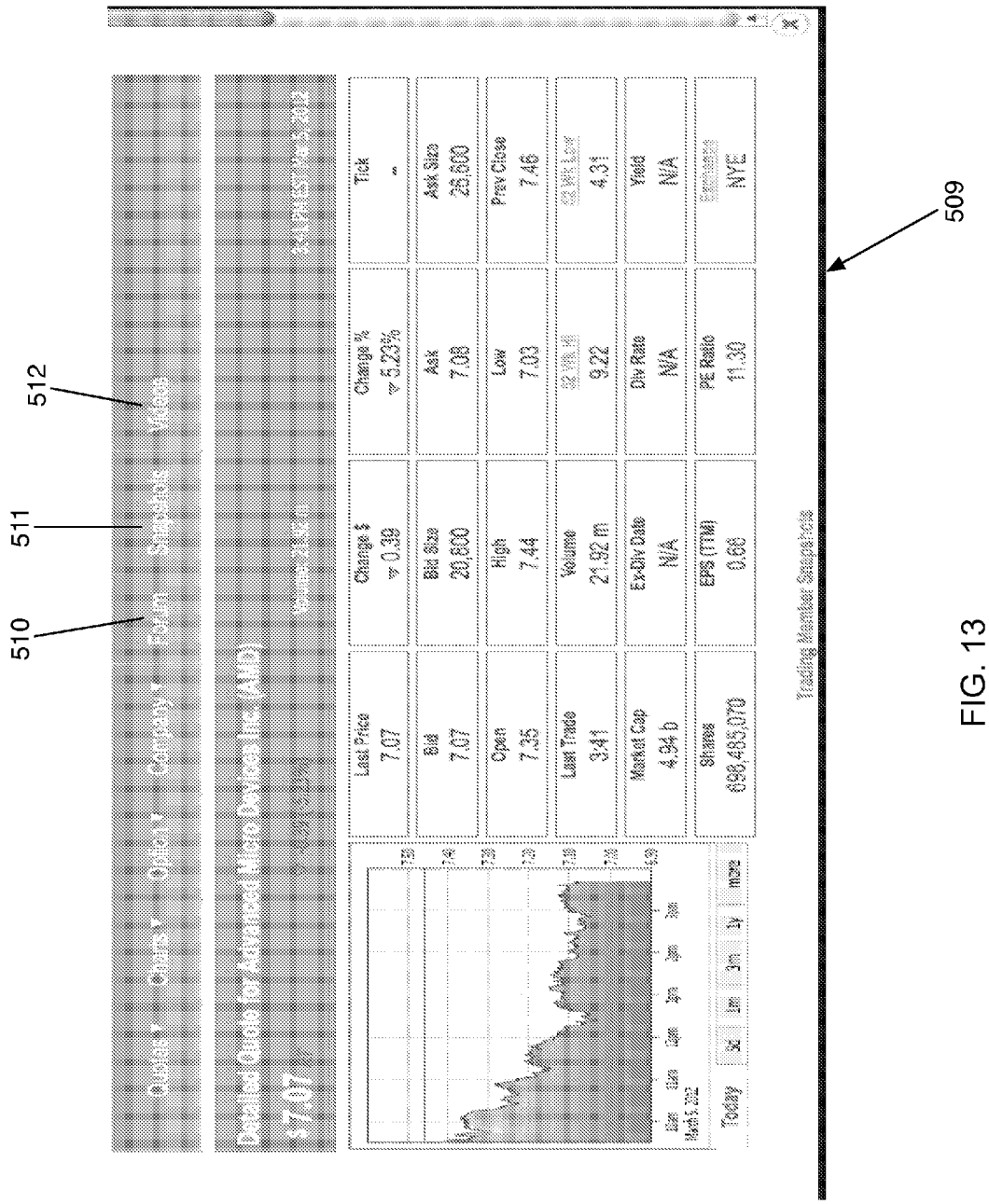
FIG. 13 is a screenshot of an example embodiment of a popup window displaying a market data synopsis of a followed ticker according to the present disclosure.

FIG. 13 is a screenshot of an example embodiment of a popup window displaying a market data synopsis of a followed ticker according to the present disclosure.

Upon clicking ticker element 505, as shown in FIG. 12, a popup window 509 is displayed. Window 509 displays current market data and, via the prefix key, other relating features of system 12 corresponding to the ticker corresponding to element 505. Some example of such features include a tabular forum link 510 linking to forum posts associated to the ticker, a snapshot tabular link 511 linking to snapshot images associated with the ticker and a tabular videos link 512 linking to videos associated with the ticker. Also, window 509 displays quotes tabular link, charts tabular link, options tabular link and company tabular link. Such tabular links can be accessed and provide info via the prefix key.

Figure 14:
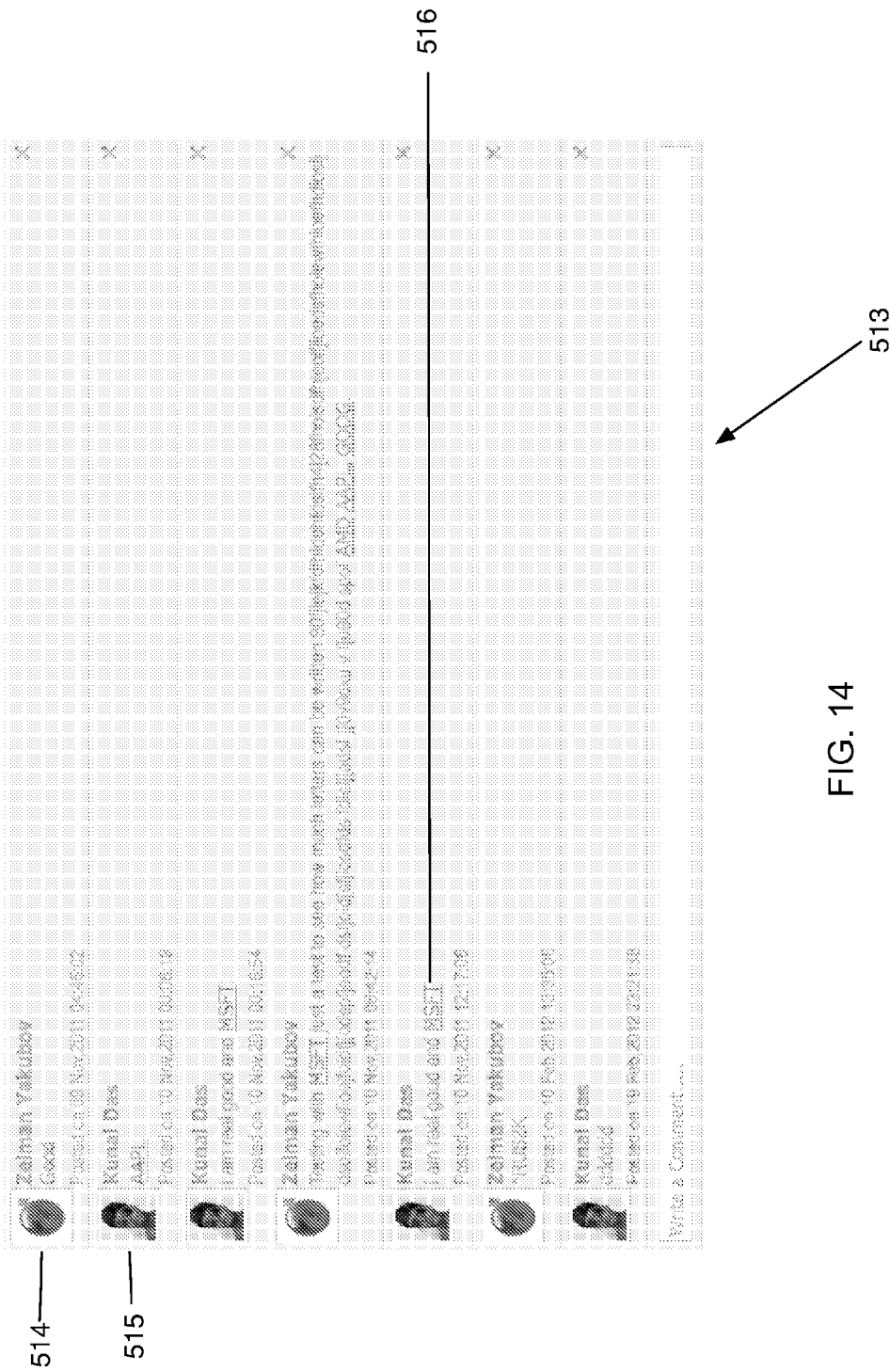
FIG. 14 is a screenshot of a portion of an example embodiment of a personal member page according to the present disclosure.

FIG. 14 is a screenshot of a portion of an example embodiment of a personal member page according to the present disclosure.

Each user of social networking system 12 has a individual member personal page with a posting wall 513. This page is maintained by a member 514, who can post information on wall 513 visible to a member's friend 515 or the general public. Access to this page or wall 513 is maintained by member 514, such as by member 514 privacy settings, such as tiered levels of access. Also shown is a plurality of posts on wall 513 between members 514 and 515 discussing a ticker link 516 visually distinct via prefix key integration. Also, a ticker symbol can automatically be turned into ticker link 516 by system 12 during typing of the post when the ticker symbol is entered, prior to submitting the post.

Figure 15:
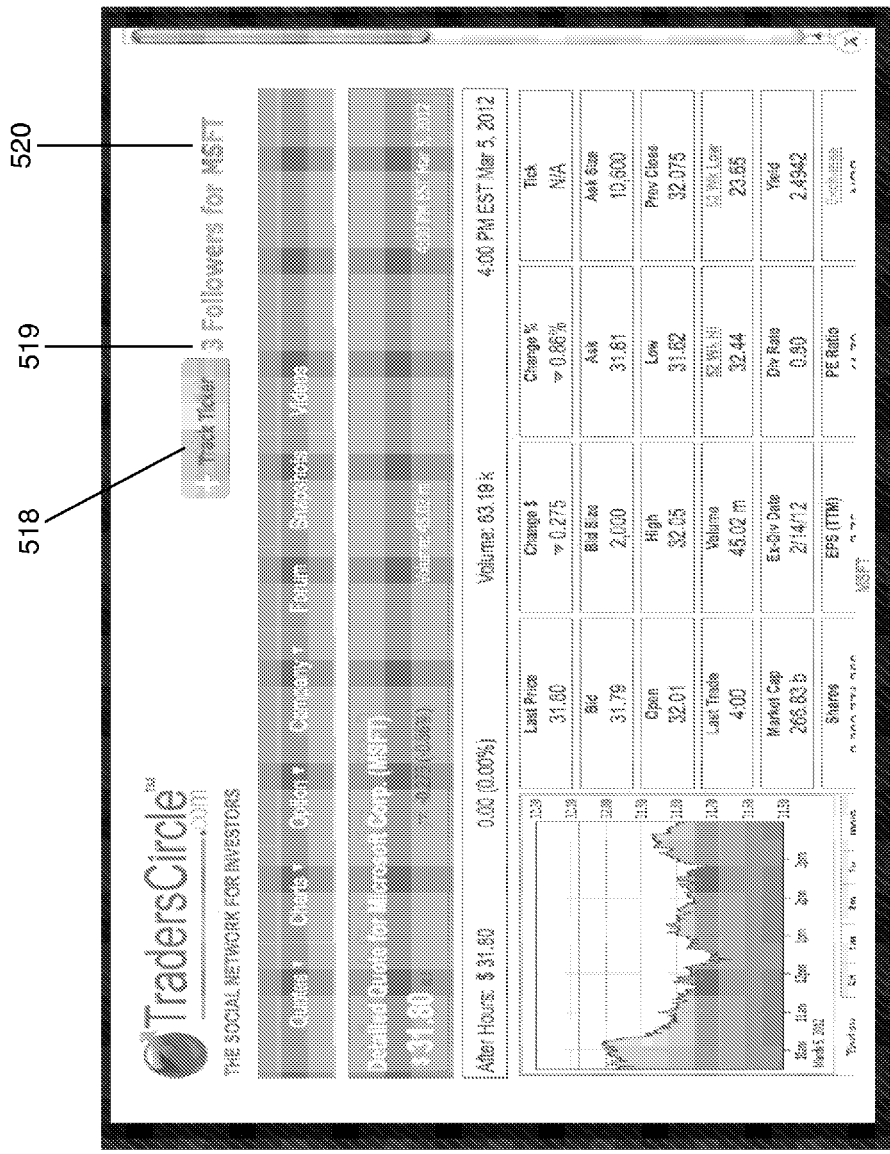
FIG. 15 is a screenshot of an example embodiment of a track ticker button adjacent to a number of ticker followers according to the present disclosure.

FIG. 15 is a screenshot of an example embodiment of a track ticker button adjacent to a number of ticker followers according to the present disclosure.

Upon clicking link 516, a popup window 517 is displayed. Similar to window 509, window 517 displays current market data and, via the prefix key, other relating features of system 12 corresponding to the ticker corresponding to element 505. Additionally, window 517 displays a track ticker button 518, a number element 519 and a ticker followers element 520. If a user is not following a ticker linked by link 516, then button 518 appears unpressed/unselected and upon pressing, allows the user to start following the ticker. In order to encourage users to follow many tickers, button 518 can appear on any window on system 12, such as windows displaying market data. Also, when market synopsis appears and button 518 appears pressed, then to un-follow a ticker, the user un-presses/un-selects button 518. Number element 519 displays a numerical value corresponding to a number of users of system 12 following the ticker linked by link 516. Ticker followers element 520 displays a code corresponding to the ticker. As shown, ticker MSFT has 3 followers.

Figure 16:
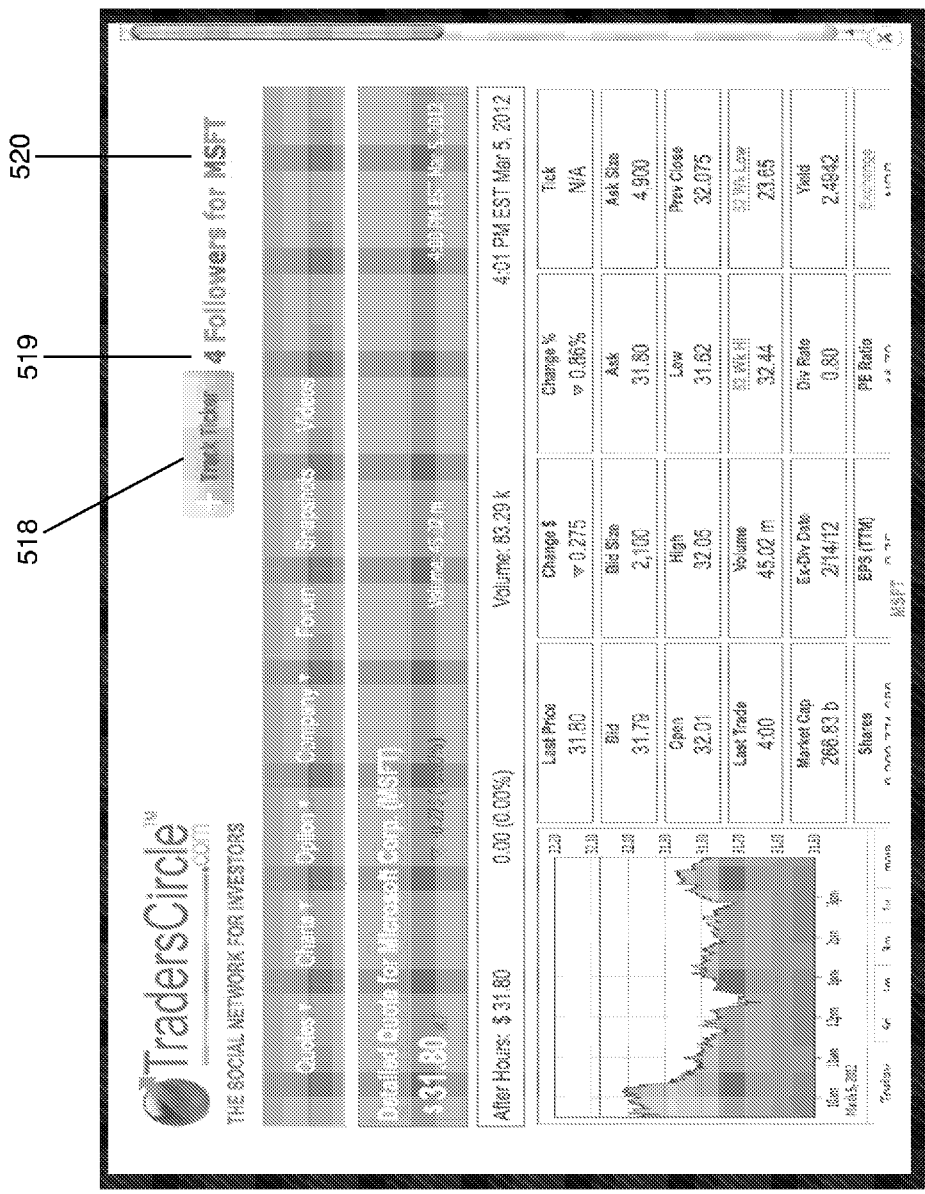
FIG. 16 is a screenshot of an example embodiment of a track ticker button after pressing and increasing a number of ticker followers according to the present disclosure.

FIG. 16 is a screenshot of an example embodiment of a track ticker button after pressing and increasing a number of ticker followers according to the present disclosure.

Upon clicking button 518, the user of system 12 starts to following the ticker. As shown, element 519 displays a numerical value corresponding to a number of users of system 12 following the ticker. As shown, ticker MSFT now has 4 followers.

Figure 17:
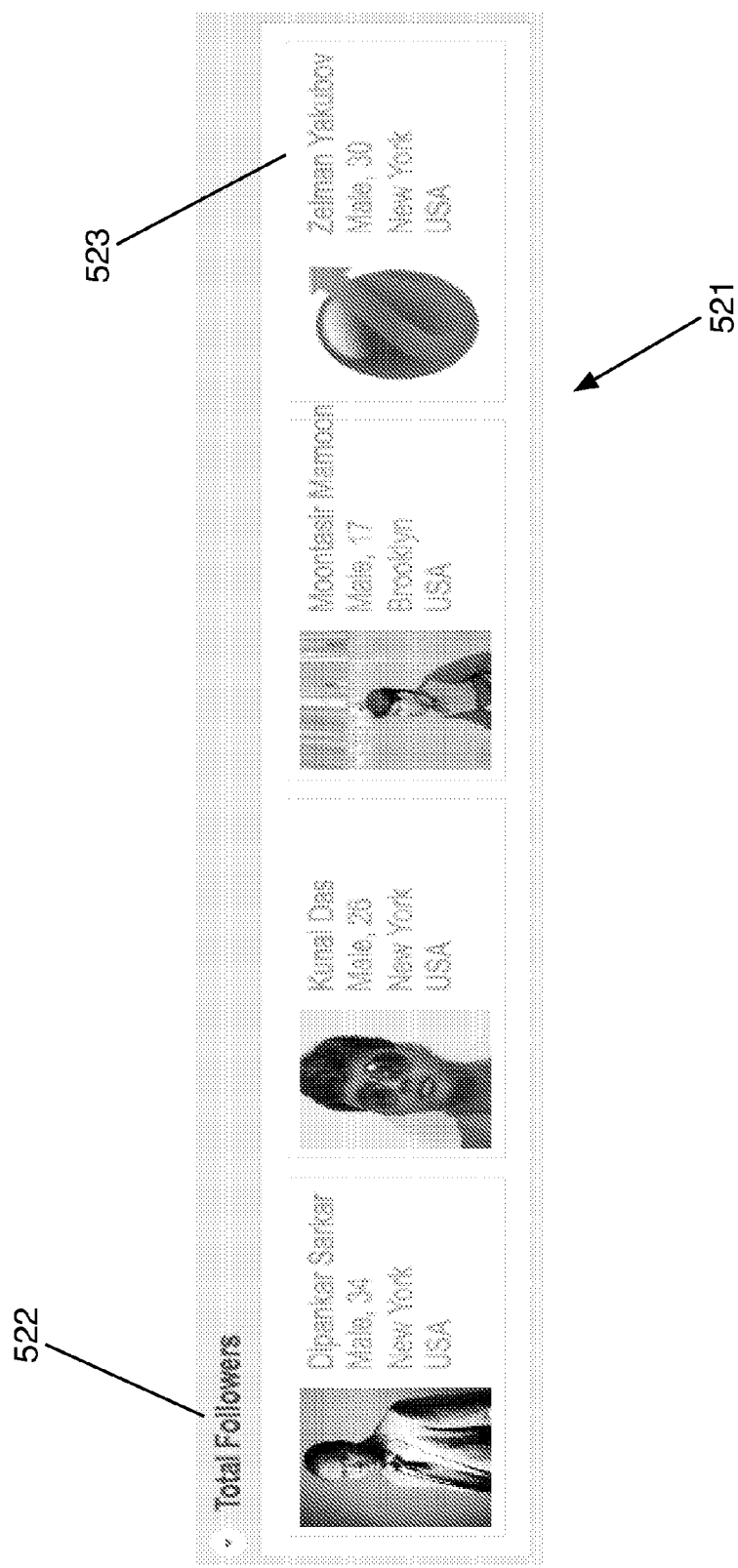
FIG. 17 is a screenshot of an example embodiment of a list of ticker followers according to the present disclosure.

FIG. 17 is a screenshot of an example embodiment of a list of ticker followers according to the present disclosure.

Upon clicking elements 519 or 520, as shown above, a list of ticker followers window 521 is displayed. Window 521 includes a label element 522 displaying a name of window 521, which indicates a total amount of followers for the ticker, and a ticker follower member icon 521 linking to a profile page of a ticker follower of the ticker. Icon 521 can display user name, gender, picture and location and other profile data.

Figure 18:
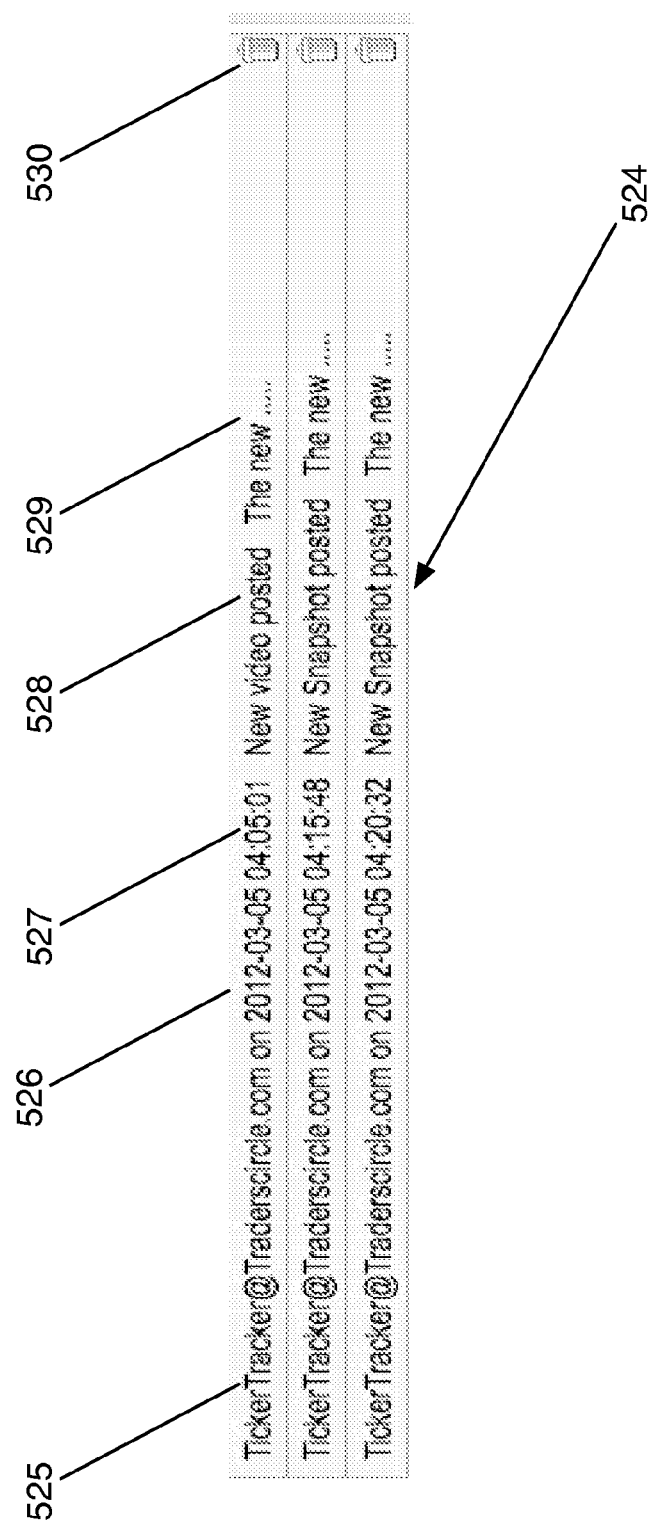
FIG. 18 is a screenshot of an example embodiment of an electronic mailbox storing messages received in response to postings relating to a followed ticker according to the present disclosure.

FIG. 18 is a screenshot of an example embodiment of an electronic mailbox storing messages received in response to postings relating to a followed ticker according to the present disclosure.

As described above, on system 12, users can follow system 12 events associated with preselected ticker symbols via the prefix key. This type of following can occur via events such as content posted on message forums, associated with snapshots, associated with videos, news, friends' pages and personal pages. For example, when the user posts a message having a certain ticker to the forum or posts a snapshot or a video associated with or having the ticker, then all users of system 12 who are following that ticker will automatically receive a notification of such post. The notification includes a link to such post in a section of system 12 where the post was made.

An example of such notification is an email message for communication at least within system 12. A plurality of such email messages are stored in an electronic mailbox 524. Each message comes from a ticker track email address 525 at a certain date 526 on a certain time 527 with a certain topic 528 relating to the posting. Mailbox 524 allows display of a message snippet 529 and a delete email message icon 530 for deleting the message.

Figure 19:
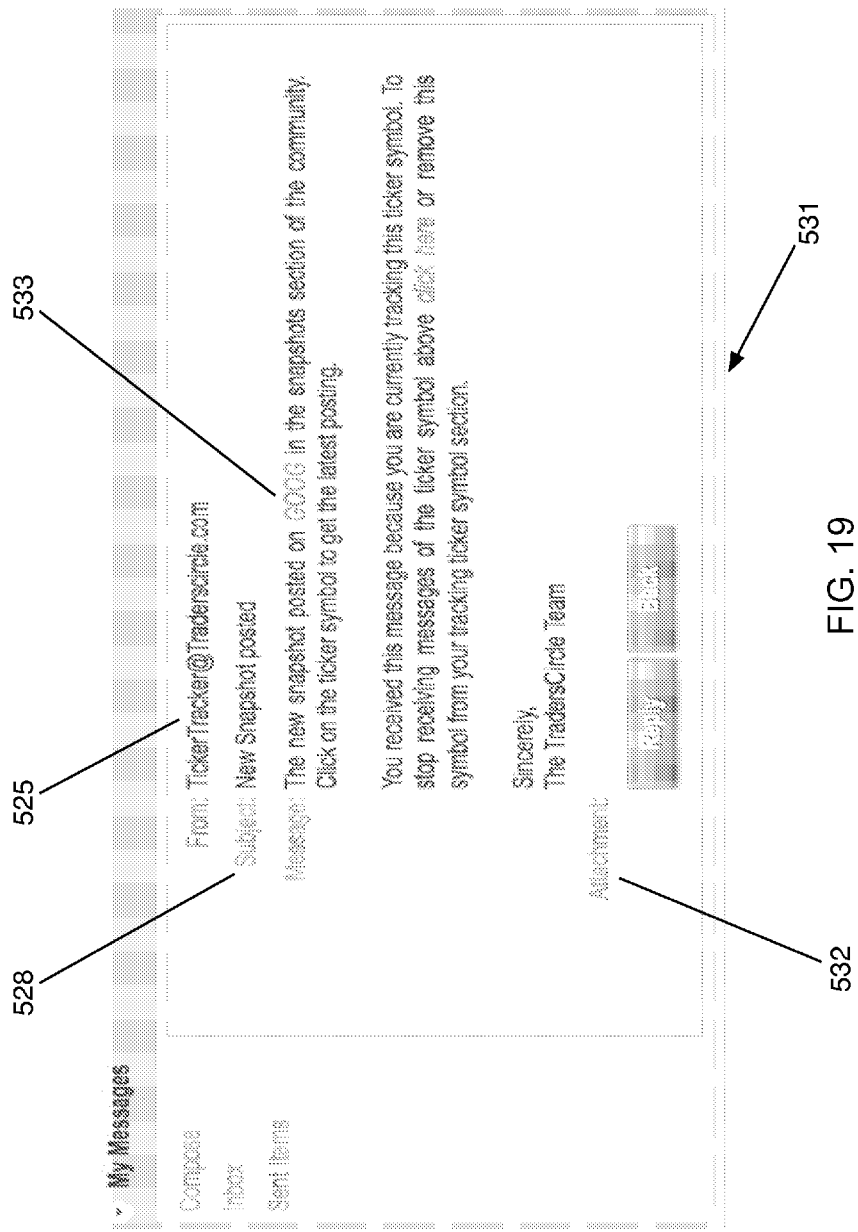
FIG. 19 is a screenshot of an example embodiment of contents of an email message received in response to a snapshot post relating to a followed ticker according to the present disclosure.

FIG. 19 is a screenshot of an example embodiment of contents of an email message received in response to a snapshot post relating to a followed ticker according to the present disclosure.

An email message 531 from mailbox 524 includes email address 525 and subject 528. Message 531 includes a ticker link 533 displayed as a followed ticker via the prefix key, as described above. Message 531 also includes an attachment link 532, which upon clicking displays an attachment attached to message 531.

Figure 20:
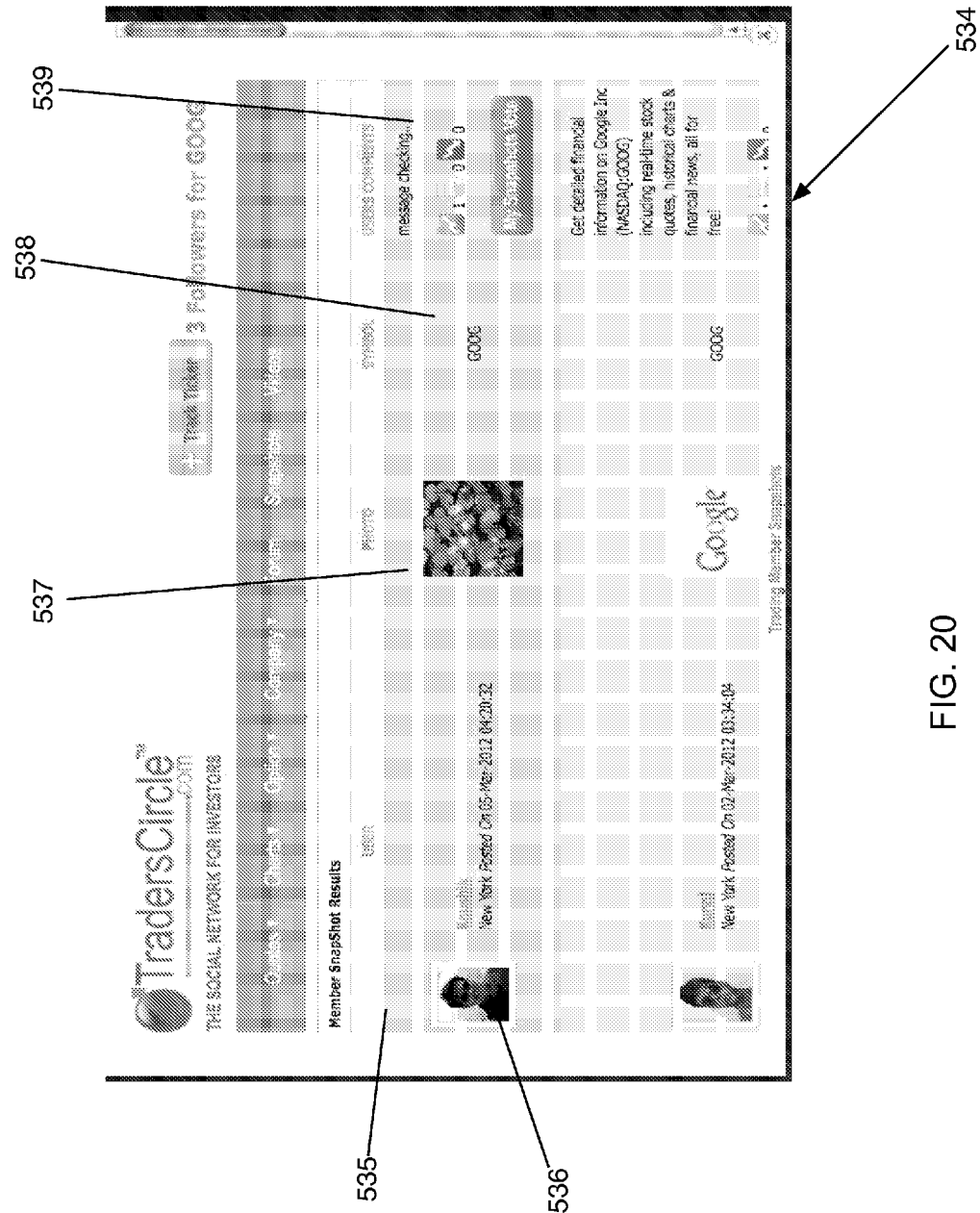
FIG. 20 is a screenshot of an example embodiment of a post associated with a followed ticker as linked by a link from an email message according to the present disclosure.

FIG. 20 is a screenshot of an example embodiment of a post associated with a followed ticker as linked by a link from an email message according to the present disclosure.

Upon clicking link 533, via the prefix key, a window 534 and its contents are displayed. Window 534 includes a latest posting/news 535 relating to the ticker linked by link 533. Latest posting/news 535 includes a poster profile information 536, which includes a user profile name, a profile photo, a time, a date of posting, a post 537, such as a snapshot associated with the ticker, a ticker 538 associated with the post and user comments 539 associated with the post.

Figure 21:
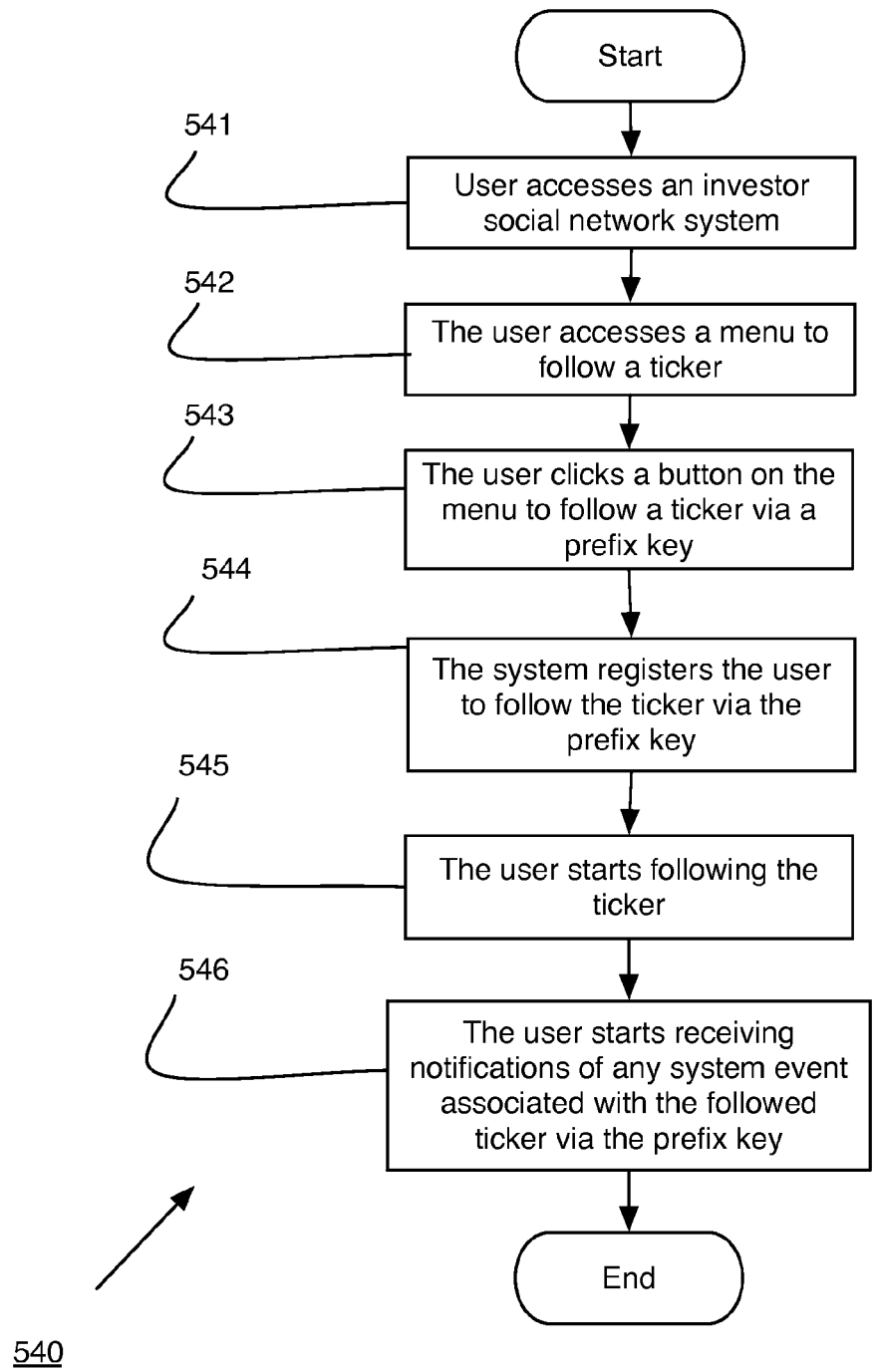
FIG. 21 is a flowchart of an example embodiment of a follow process a user performs in order to follow a ticker via a prefix key according to the present disclosure.

FIG. 21 is a flowchart of an example embodiment of a follow process a user performs in order to follow a ticker via a prefix key according to the present disclosure.

In block 541, a user accesses an investor social network system, such as system 12.

In block 542, the user accesses a menu to follow a ticker. The menu can be accessible from anywhere on the system, such as at a window displaying market data via the prefix key. The menu can include a link or can be a window.

In block 543, the user clicks a button on the menu to follow a ticker via a prefix key. Adjacent to a button, there can be a displays a number of followers for that ticker.

In block 544, the system registers the user to follow the ticker via the prefix key. Thus, any event, such as content posted on message forums, associated with snapshots, associated with videos, news, friends' pages and personal pages, associated with the ticker via the prefix key is now followed by the user.

In block 545, the user starts following the ticker. Thus, any event associated with the ticker is now notified to the user.

In block 546, the user starts receiving, such as via system email, notifications of any system event associated with the followed ticker via the prefix key. Such notifications include a link displayed as the followed ticker. The link links to a window displaying market data for the followed ticker via the prefix key.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" and "includes" and/or "including," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

In conclusion, herein is presented an online investment social network that allows individuals interested in investing in stocks, commodities, bonds, foreign exchange, futures, and other types of financial instruments to track their investments and discuss them with other individuals that have a similar interest as well as buy or sell financial instruments through a social networking website. The present disclosure is illustrated by example in the drawing figures, and throughout the written description. It should be understood that numerous variations are possible, while adhering to the inventive concept. Such variations are contemplated as being a part of the present disclosure.

What is claimed is:

1. A method comprising:
    maintaining a social networking system in a computer system, the social networking system having at least two users with at least two searchable social networking profiles;
    displaying communications within the social networking system between the at least two users, at least one of the communications including a ticker symbol as manually input into the at least one of the communications by at least one of the at least two users before communicating the at least one of the communications;
    converting, automatically and within the at least one of the communications, the displayed input ticker symbol into a ticker symbol hyperlink;
    displaying the ticker symbol hyperlink as the ticker symbol within the at least one of the communications to be visible to the at least two users within the social networking system; and
    in response to selecting the ticker symbol hyperlink within the at least one of the communications, initiating a display element internal to the social networking system displaying a synopsis of financial data about a financial instrument corresponding to the ticker symbol, the financial data retrieved from a data source external to the social networking system.

2. The method of claim 1, further comprising:
in response to inputting the ticker symbol into the at least one of the communications prior to sending the at least one of the communications via the social networking system, displaying the ticker symbol hyperlink as the ticker symbol within the at least one of the communications, the display element is a new window or a window element associated with the at least one of the communications, the synopsis including a news element displaying a plurality of news links corresponding to news associated with the ticker symbol.

3. The method of claim 1, wherein the social networking system is an investor social networking system, the profile including a financial instrument watchlist of the user and an investment portfolio of the user, a content of at least one of the financial instrument watchlist of the user and the investment portfolio of the user is at least partially shared with other users via tiered levels of access, the communications including chat between the at least two users, the ticker symbol associated with a prefix key.

4. The method of claim 3, wherein the investor social networking system including a message forum having a plurality of message posts related to financial instruments, a forum hyperlink appearing within the display element linking to a forum post within the forum associated with the ticker symbol, the communications including the message posts, the ticker symbol including a capital letter.

5. The method of claim 4, wherein the social networking system including a snapshot posting element configured for posting a snapshot image associated with the ticker symbol and linked by a snapshot posting hyperlink appearing within the display element, the snapshot posting hyperlink linking to a posted snapshot image associated with the ticker symbol, the social networking system including a video posting element linked by a video posting hyperlink appearing within the display element, the video hyperlink linking to a posted video associated with the ticker symbol, the profile displays a list of recent social networking activities engaged in by the user, at least one of the activities associated with at least one of the forum, the snapshot posting element and the video posting element.

6. The method of claim 3, wherein the display element including a trading hyperlink to a trading house configured for execution of an order to buy or sell the financial instrument, the trading house external to the social networking system.

7. The method of claim 3, further comprising:
receiving a ticker symbol follow request from one of the users of the social networking system;
registering the ticker symbol follow request within the social networking system such that the one of the users is notified of a user event associated with the ticker symbol, the user event excluding user events associated with the one of the users; and
in response to the user event, notifying the one of the users.

8. The method of claim 7, further comprising:
displaying a current total number of followed ticker symbols associated with the one of the users;
displaying a ticker symbol hyperlink list of all ticker symbols followed by the one of the users,
wherein the notifying including a message having a subject associated with the user event, the at least two users including the one of the users.

9. The method of claim 8, further comprising:
displaying a ticker symbol follow request hyperlink in the display element; and
in response to clicking the ticker symbol follow request hyperlink, initiating the ticker symbol follow request.

10. The method of claim 8, further comprising:
displaying a ticker symbol message hyperlink corresponding to the ticker symbol within the message; and
in response to clicking ticker symbol message hyperlink within the message, initiating another display element.

11. The method of claim 8, wherein the display element including a ticker symbol follower number corresponding to a numerical value of users following the ticker symbol, the ticker symbol follower number periodically updated.

12. The method of claim 11, further comprising:
displaying a list of ticker symbol followers hyperlink within the display element; and
in response to clicking the ticker symbol followers hyperlink, displaying a list of ticker symbol follower links including the ticker symbol.

13. A system comprising:
a server including a computer processor coupled to a memory, an application stored in the memory and configured for execution on the computer processor, the application implementing a method comprising:
maintaining a social networking system having at least two users with at least two searchable social networking profiles;
displaying communications within the social networking system between the at least two users, at least one of the communications including a ticker symbol including capital letters, the ticker symbol as manually input into the at least one of the communications by at least one of the at least two users before communicating the at least one of the communications;
converting, automatically and within the at least one of the communications, the displayed input ticker symbol into a ticker symbol hyperlink and displaying the ticker hyperlink as the ticker symbol within the at least one of the communications to be visible to the at least two users within the social networking system; and
in response to selecting the ticker symbol hyperlink within the at least one of the communications, initiating a display element internal to the social networking system displaying a synopsis of financial data and news links about a financial instrument corresponding to the ticker symbol, the financial data retrieved from a data source external to the social networking system.

14. The Internet-based system of claim 13, further comprising:
in response to inputting the ticker symbol into the at least one of the communications prior to sending the at least one of the communications via the social networking system, displaying the ticker symbol hyperlink as the ticker symbol within the at least one of the communications, the display element is a new window or a window element associated with the at least one of the communications, the communications including chat.

15. The Internet-based system of claim 13, wherein the social networking system is an investor social networking system, the profile including a financial instrument watchlist of the user and an investment portfolio of the user, a content of at least one of the financial instrument watchlist and the investment portfolio is at least partially shared with other users via tiered levels of access, the ticker symbol associated with a prefix key, the investor social networking system including a message forum having a plurality of message posts related to financial instruments, a forum hyperlink appearing within the display element linking to a forum post within the forum associated with the ticker symbol, the communications including the message posts.

16. The Internet-based system of claim 15, wherein the social networking system including a snapshot posting element configured for posting a snapshot image associated with the ticker symbol and linked by a snapshot posting hyperlink appearing within the display element, the snapshot posting hyperlink linking to a posted snapshot image associated with the ticker symbol, the social networking system including a video posting element linked by a video posting hyperlink appearing within the display element, the video hyperlink linking to a posted video associated with the ticker symbol, the profile displays a list of recent social networking activities engaged in by the user, at least one of the activities associated with at least one of the forum, the snapshot posting element and the video posting element, the display element including a trading hyperlink to a trading house configured for execution of an order to buy or sell the financial instrument, the trading house external to the social networking system.

17. The Internet-based system of claim 13, further comprising:
receiving a ticker symbol follow request from one of the users of the social networking system;
registering the ticker symbol follow request within the social networking system such that the one of the users is notified of a user event associated with the ticker symbol, the user event excluding user events associated with the one of the users; and
in response to the user event, notifying the one of the users.

18. The Internet-based system of claim 17, further comprising:
displaying a current total number of followed ticker symbols associated with the one of the users;
displaying a ticker symbol hyperlink list of all ticker symbols followed by the one of the users,
wherein the notifying including a message having a subject associated with the user event, the at least two users including the one of the users.

19. The Internet-based system of claim 17, further comprising:
displaying a ticker symbol follow request hyperlink in the display element;
in response to clicking the ticker symbol follow request hyperlink, initiating the ticker symbol follow request;
displaying a ticker symbol message hyperlink corresponding to the ticker symbol within the message; and
in response to clicking ticker symbol message hyperlink within the message, initiating another display element.

20. The Internet-based system of claim 19, further comprising:
displaying a list of ticker symbol followers hyperlink within the display element; and
in response to clicking the ticker symbol followers hyperlink, displaying a list of ticker symbol follower links including the ticker symbol,
wherein the display element including a ticker symbol follower number corresponding to a numerical value of users following the ticker symbol, the ticker symbol follower number periodically updated.

* * * * *